United States Patent
Ota et al.

(10) Patent No.: US 11,427,069 B2
(45) Date of Patent: Aug. 30, 2022

(54) VEHICLE DRIVE DEVICE

(71) Applicants: AISIN CORPORATION, Aichi (JP); TOYOTA JIDOSHA KABUSHIKI KAISHA, Toyota (JP)

(72) Inventors: Hiroshi Ota, Kariya (JP); Ken Shimizu, Kariya (JP); Ren Okazawa, Kariya (JP); Masashi Ikemura, Toyota (JP); Guo Dong Tan, Toyota (JP); Takao Oki, Toyota (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/426,151

(22) PCT Filed: Mar. 27, 2020

(86) PCT No.: PCT/JP2020/014032
§ 371 (c)(1),
(2) Date: Jul. 28, 2021

(87) PCT Pub. No.: WO2020/203776
PCT Pub. Date: Oct. 8, 2020

(65) Prior Publication Data
US 2022/0097513 A1    Mar. 31, 2022

(30) Foreign Application Priority Data
Mar. 29, 2019   (JP) .............................. JP2019-067566

(51) Int. Cl.
*B60K 6/40*     (2007.10)
*B60K 6/387*    (2007.10)
*F16H 45/02*    (2006.01)

(52) U.S. Cl.
CPC ................ *B60K 6/387* (2013.01); *B60K 6/40* (2013.01); *F16H 45/02* (2013.01); *B60Y 2200/92* (2013.01); *B60Y 2400/426* (2013.01)

(58) Field of Classification Search
CPC .......... B60K 6/387; B60K 6/40; F16H 45/02; B60Y 2200/92; B60Y 2400/426
See application file for complete search history.

(56) References Cited

U.S. PATENT DOCUMENTS

2008/0210050 A1    9/2008  Prettyman
2012/0242199 A1*   9/2012  Iwase ...................... F16D 21/08
                                                   310/68 B (Continued)

FOREIGN PATENT DOCUMENTS

JP    2015-174561 A    10/2015
JP    2018-196219 A    12/2018

OTHER PUBLICATIONS

Jun. 30, 2020 International Search Report issued in International patent Application No. PCT/JP2020/014032.

*Primary Examiner* — David J Hlavka
(74) *Attorney, Agent, or Firm* — Oliff PLC

(57) ABSTRACT

A vehicle drive device that includes a rotary electric machine that serves as a driving force source for wheels; a first rotation member coupled to a rotor of the rotary electric machine; and a fluid coupling that is disposed on an axial first side, which is one side in an axial direction with respect to the rotary electric machine, and that has a rotation housing.

20 Claims, 9 Drawing Sheets

(56) References Cited

U.S. PATENT DOCUMENTS

| | | | |
|---|---|---|---|
| 2012/0319514 A1* | 12/2012 | Iwase | B60L 50/16 |
| | | | 310/78 |
| 2013/0035202 A1* | 2/2013 | Ideshio | F16D 25/0638 |
| | | | 477/6 |
| 2013/0310216 A1* | 11/2013 | Kamiya | B60K 6/48 |
| | | | 903/902 |
| 2015/0166049 A1 | 6/2015 | Frait et al. | |
| 2015/0258884 A1 | 9/2015 | Ideshio et al. | |
| 2016/0105060 A1* | 4/2016 | Lindemann | H02K 7/10 |
| | | | 310/78 |
| 2016/0109010 A1* | 4/2016 | Lindemann | B60K 6/36 |
| | | | 192/3.21 |

\* cited by examiner

VEHICLE DRIVE DEVICE

TECHNICAL FIELD

The present disclosure relates to a vehicle drive device including: a rotary electric machine serving as a driving force source for wheels; and a fluid coupling.

BACKGROUND ART

An example of such a vehicle drive device is disclosed in Patent Document 1 below. Hereinafter, in the description of the background art, reference numerals in Patent Document 1 are quoted in parentheses.

In a vehicle drive device (16) of Patent Document 1, a first rotation member (66) and a second rotation member (64) are selectively coupled via an internal combustion engine cut-off engagement device (26). A flex plate (68) that is extended radially outward with respect to the first rotation member is integrally rotatably coupled to the first rotation member (66). The flex plate (68) is integrally rotatably coupled to a rotation housing of a fluid coupling (22). Specifically, the flex plate (68) and the rotation housing are provided with a plurality of fastening portions along the circumferential direction, and the flex plate (68) and the rotation housing are fastened by the fastening member (78), at each of the plurality of fastening portions.

RELATED ART DOCUMENTS

Patent Documents

Patent Document 1: US Patent Application Publication No. 2015/0166049 Disclosure (paragraphs 0033 and 0034, and FIGS. 2 and 4).

SUMMARY OF THE DISCLOSURE

Problem to be Solved by the Invention

By the way, in the manufacturing step of the vehicle drive device (16) of Patent Document 1, fastening work at each of the plurality of fastening portions is performed through an opening portion (80) of a case (60). At that time, it is necessary to rotate the flex plate (68) and the rotation housing so that a position of the fastening portion, which is a working target, in the circumferential direction corresponds to a position of the opening portion (80) in the circumferential direction.

As a first method, Patent Document 1 discloses a method in which by setting the internal combustion engine cut-off engagement device (26) in an engaged state, rotating the second rotation member (64) that is easily accessible from the outside of the case (60), and rotating the first rotation member (66) and the flex plate (68), the position of the fastening portion, which is the working target among the plurality of fastening portions, in the circumferential direction is made to correspond to the position of the opening portion (80) in the circumferential direction.

Further, as a second method, Patent Document 1 discloses a method in which a plurality of notches (76) is provided on an outer peripheral portion of the flex plate (68) at regular intervals, a tool (84) such as a crowbar or a flat-blade screwdriver is inserted in the notches (76) through an opening portion (80) of the case (60), and in a state in which an internal combustion engine cut-off engagement device (26) is released, the flex plate (68) and the first rotation member (66) are rotated by the tool (84).

However, in any of the above methods, in a state in which none of the fastening portions are fastened, since the flex plate (68) and the rotation housing rotate relative to each other, the work of making the position of the fastening portion that is a working target among the plurality of fastening portions in the circumferential direction correspond to the position of the opening portion (80) in the circumferential direction is likely to be complicated. As a result, there is a problem that man-hours for manufacturing the vehicle drive device (16) are increased.

Therefore, it is desired to realize a technology that can reduce man-hours for manufacturing a vehicle drive device.

Means for Solving the Problem

As the characteristic configuration of the vehicle drive device in view of the above, the vehicle drive device includes: a rotary electric machine that serves as a driving force source for wheels; a first rotation member coupled to a rotor of the rotary electric machine; and a fluid coupling that is disposed on an axial first side, which is one side in an axial direction with respect to the rotary electric machine, and that has a rotation housing, in which a plurality of fastening portions is provided in the first rotation member and the rotation housing along a circumferential direction, the first rotation member and the rotation housing are fastened by a fastening member at each of the plurality of fastening portions, each of the plurality of fastening portions has a first fastening hole that is formed in the first rotation member along the axial direction and in which the fastening member is inserted, and a second fastening hole that is formed in the rotation housing along the axial direction and in which the fastening member is inserted, a locked portion is provided on an outer peripheral portion of one of the first rotation member and the rotation housing, a locking portion is provided on an outer peripheral portion of the other of the first rotation member and the rotation housing, the locking portion is inserted in the axial direction with respect to the locked portion and is locked so that a relative rotation in the circumferential direction is restricted with respect to the locked portion, and the first fastening hole and the second fastening hole are disposed so as to overlap with each other when viewed in the axial direction along the axial direction in a state in which the locking portion is locked to the locked portion.

According to this characteristic configuration, by putting the locking portion in a state of being locked to the locked portion, even when none of the fastening portions are fastened by the fastening member, the relative movement of the first rotation member and the rotation housing in the circumferential direction can be restricted. Thus, even in a state in which none of the fastening portions are fastened by the fastening member, it is possible to maintain a state in which the first fastening hole and the second fastening hole are overlapped when viewed in the axial direction along the axial direction. As a result, the work of fastening the fastening portion can be easily performed. As a result, the man-hours for manufacturing the vehicle drive device can be reduced.

MODES FOR CARRYING OUT THE DISCLOSURE

Figure 1:
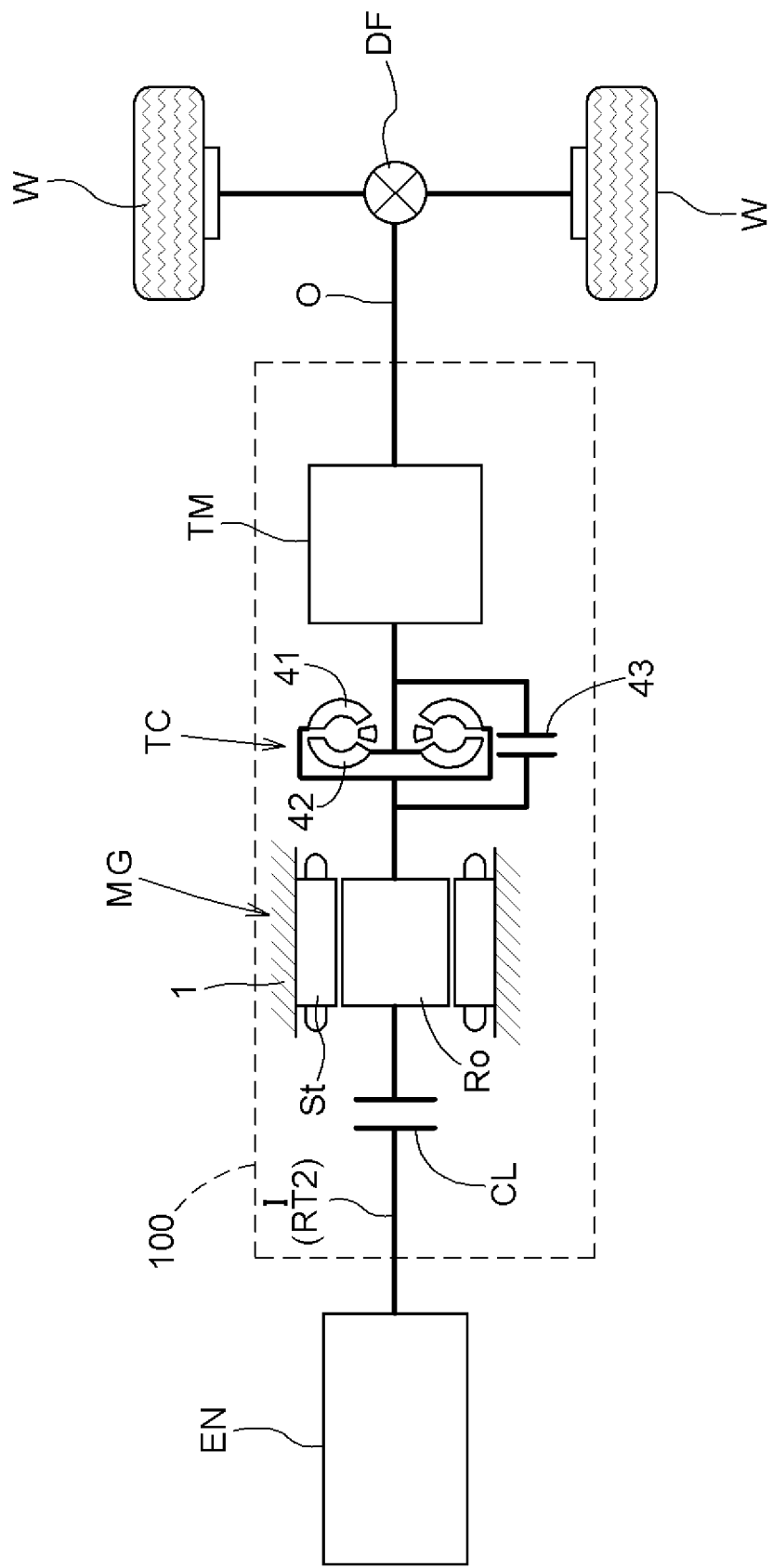
FIG. 1 is a skeleton diagram of a vehicle drive device according to the embodiment.

Hereinafter, a vehicle drive device 100 according to an embodiment will be described with reference to the drawings. As shown in FIG. 1, the vehicle drive device 100 includes a rotary electric machine MG that is a driving force source for wheels W, a first rotation member RT1 coupled to a rotor Ro of the rotary electric machine MG, and a torque converter TC. The torque converter TC is provided in a power transmitting path between the rotary electric machine MG and an output shaft O. In the present embodiment, the output shaft O is drivingly coupled to the pair of wheels W via a differential gear device DF. Thus, the rotation and torque transmitted to the output shaft O are distributed to the pair of wheels W by the differential gear device DF.

In the following description, unless otherwise specified, an "axial direction L", a "radial direction R", and a "circumferential direction C" are defined with reference to an axial center of the rotary electric machine MG. Then, the torque converter TC side (right side in FIG. 2) is referred to as an "axial first side L1" with respect to the rotary electric machine MG in the axial direction L, and an opposite side thereof (left side in FIG. 2) is referred to as an "axial second side L2". Further, in the radial direction R, the axial center side of the rotary electric machine MG is referred to as an "inner radial side R1", and the opposite side is referred to as an "outer radial side R2".

In the present embodiment, the vehicle drive device 100 is also configured to be capable of transmitting the torque of an internal combustion engine EN to the wheels W to make the vehicle travel. Specifically, as shown in FIG. 1, the vehicle drive device 100 includes a second rotation member RT2 that is drivingly coupled to the internal combustion engine EN, and an engagement device CL that is disposed between the second rotation member RT2 and the first rotation member RT1 in the power transmitting path and that selectively couples the internal combustion engine EN and the rotary electric machine MG. As a result, in the present embodiment, the vehicle drive device 100 is configured as a drive device for a so-called one-motor parallel type hybrid vehicle that uses one or both of the internal combustion engine EN and the rotary electric machine MG as the driving force source for the wheels W.

In the present embodiment, the first rotation member RT1 and the second rotation member RT2 are disposed coaxially. The second rotation member RT2 is disposed on the axial second side L2 with respect to the first rotation member RT1. Further, in the present embodiment, the second rotation member RT2 is configured to be rotatable independently from the first rotation member RT1. As described above, in the present embodiment, since the engagement device CL is provided, the first rotation member RT1 and the second rotation member RT2 rotate integrally when the engagement device CL is in an engaged state.

The internal combustion engine EN is a prime mover (gasoline engine, diesel engine, etc.) that is driven by combustion of fuel to extract power. An output shaft (crankshaft, etc.) of the internal combustion engine EN is drivingly coupled to the second rotation member RT2. It is preferable that the output shaft of the internal combustion engine EN is drivingly coupled to the second rotation member RT2 via a damper (not shown) that dampens fluctuations in the transmitted torque.

In the present embodiment, a transmission TM is disposed between the torque converter TC and the output shaft O in the power transmitting path. The transmission TM is a device that can change a speed ratio stepwise or in a stepless manner, and shifts a rotation speed of an intermediate shaft M serving as a shifting input shaft at a predetermined speed ratio to transmit to the output shaft O serving as a shifting output shaft.

Figure 2:
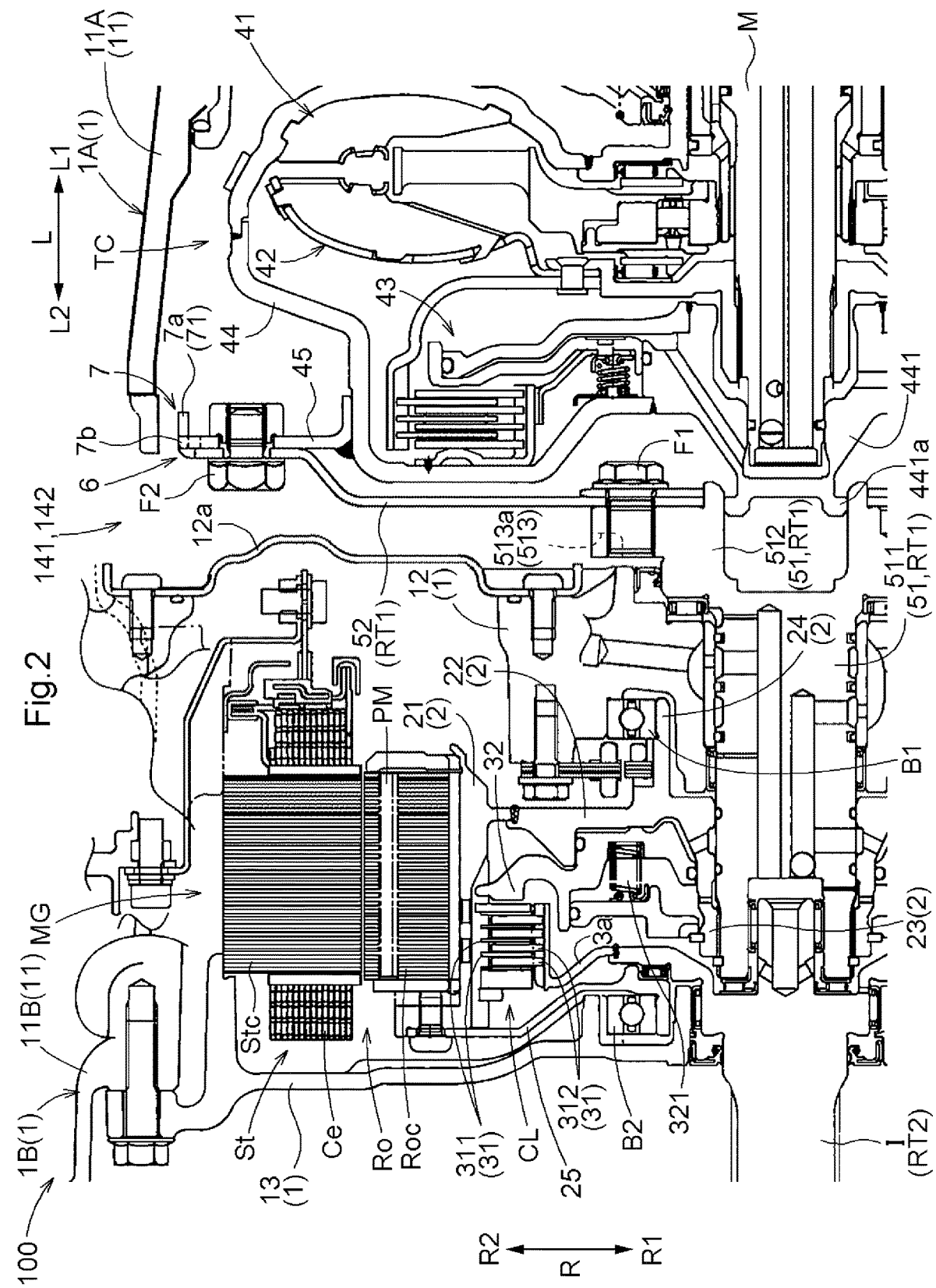
FIG. 2 is a sectional view taken along an axial direction of a main portion of the vehicle drive device according to the embodiment.

As shown in FIG. 2, in the present embodiment, the rotary electric machine MG, the first rotation member RT1, the second rotation member RT2, the torque converter TC, and the transmission TM are housed in a case 1. In the present embodiment, the case 1 includes a peripheral wall portion 11, a first side wall portion 12, and a second side wall portion 13. Further, in the present embodiment, the case 1 includes two portions that can be separated in the axial direction L. Specifically, the case 1 includes a first case portion 1A, and a second case portion 1B that is joined to the first case portion 1A on the axial second side L2.

The peripheral wall portion 11 is formed in a tubular shape that surrounds the outer radial side R2 of the rotary electric machine MG, the torque converter TC, and the like. In the present embodiment, the peripheral wall portion 11 includes a first peripheral wall portion 11A formed in the first case portion 1A and a second peripheral wall portion 11B formed in the second case portion 1B. Further, a space formed on the inner radial side R1 of the peripheral wall portion 11 is defined in the axial direction L by the first side wall portion 12 and the second side wall portion 13. In the present embodiment, the first side wall portion 12 and the second side wall portion 13 are disposed in the order described from the axial first side L1. The rotary electric machine MG and the engagement device CL are disposed in a space between the first side wall portion 12 and the second side wall portion 13. Further, the torque converter TC is disposed in a space on the axial first side L1 with respect to the first side wall portion 12.

The first side wall portion 12 is formed so as to extend from the peripheral wall portion 11 to the inner radial side R1. In the present embodiment, the first side wall portion 12 is fixed to the second case portion 1B. The first side wall portion 12 is disposed between the rotary electric machine MG and the engagement device CL, and the torque converter TC. An opening that extends through the first side wall portion 12 in the axial direction L is formed in the first side wall portion 12, and the opening is closed by a closing member 12a. Further, the first side wall portion 12 supports the first rotation member RT1 so that the first rotation member RT1 is rotatable, in a state in which the first rotation member RT1 is inserted through a through hole that is extended through the first side wall portion 12 in the axial direction L. In the present embodiment, the first rotation member RT1 is disposed coaxially with the second rotation member RT2 and the intermediate shaft M. The detailed configuration of the first rotation member RT1 will be described later.

The second side wall portion 13 is formed so as to extend from the peripheral wall portion 11 to the inner radial side R1. In the present embodiment, the second side wall portion 13 is fixed to the second case portion 1B. The second side wall portion 13 is disposed on the axial second side L2 with respect to the rotary electric machine MG and the engagement device CL. The second side wall portion 13 supports the second rotation member RT2 so that the second rotation member RT2 is rotatable, in a state in which the second rotation member RT2 is inserted in a through hole that is extended through the second side wall portion 13 in the axial direction L.

The rotary electric machine MG has a stator St, and the rotor Ro that is disposed on the inner radial side R1 with respect to the stator St. The "rotary electric machine" is used as a concept including any of a motor (electric motor), a generator (power generator), and a motor generator that functions as both a motor and a generator if necessary.

The stator St has a stator core Stc, and a coil wound around the stator core Stc so that a coil end portion Ce protruding from the stator core Stc to each of both sides in the axial direction L (the axial first side L1 and the axial second side L2). In the present embodiment, the stator core Stc is fixed to the second case portion 1B. The rotor Ro has a rotor core Roc and a permanent magnet PM disposed in the rotor core Roc. In the present embodiment, each of the stator core Stc and the rotor core Roc is formed by stacking a plurality of stacked bodies, which are annular plate-shaped magnetic materials (for example, electromagnetic steel plates or the like) in the axial direction L.

In the present embodiment, the rotor Ro is supported by a rotor support member 2. The rotor support member 2 has a first tubular portion 21, a support portion 22, a second tubular portion 23, and a third tubular portion 24.

The first tubular portion 21 is formed in a tubular shape extended in the axial direction L. The rotor Ro is attached to an outer peripheral surface of the first tubular portion 21. The rotor Ro is attached to the outer peripheral surface of the first tubular portion 21 by welding, caulking, or the like. A bearing support portion 25 that is extended to the inner radial side R1 with respect to the first tubular portion 21 is coupled to an end portion on the axial second side L2 of the first tubular portion 21. An end portion on the inner radial side R1 of the bearing support portion 25 is supported by a second bearing B2 from the outer radial side R2. Further, the second side wall portion 13 of the case 1 supports the second bearing B2 from the outer radial side R2. In this way, the rotor support member 2 is supported by the second side wall portion 13 of the case 1 via the second bearing B2 so that the rotor support member 2 is rotatable.

The support portion 22 is formed so as to extend along the radial direction R. The support portion 22 is coupled to the first tubular portion 21 so as to protrude from the first tubular portion 21 to the inner radial side R1. A second tubular portion 23 is coupled to an end portion on the inner radial side R1 of the support portion 22. Further, the third tubular portion 24 is coupled to a portion of the support portion 22 that is on the outer radial side R2 than the second tubular portion 23.

The second tubular portion 23 is coupled to the support portion 22 so as to protrude from the support portion 22 to the axial second side L2. The first rotation member RT1 is inserted through the second tubular portion 23, and they are integrally rotatably coupled to each other. That is, in the present embodiment, the first rotation member RT1 is coupled to the rotor Ro via the rotor support member 2. The third tubular portion 24 is coupled to the support portion 22 so as to protrude from the support portion 22 to the axial first side L1. A first bearing B1 is attached to an outer peripheral surface of the third tubular portion 24. That is, the third tubular portion 24 is supported by the first bearing B1 from the outer radial side R2. Further, the first side wall portion 12 of the case 1 supports the first bearing B1 from the outer radial side R2. In this way, the rotor support member 2 is supported by the first side wall portion 12 of the case 1 via the first bearing B1 so that the rotor support member 2 is rotatable.

In the present embodiment, the engagement device CL is disposed at a position that is on the inner radial side R1 of the rotary electric machine MG, and that overlaps with the rotary electric machine MG when viewed in the radial direction along the radial direction R. Here, regarding the disposition of two elements, "overlaps when viewed in a specific direction" means that when a virtual straight line parallel to the direction of line of sight is moved in each direction orthogonal to the virtual straight line, there is at least a part of region where the virtual straight line intersects both the two elements.

Further, in the present embodiment, the engagement device CL is a friction engagement device, and a state of engagement is controlled based on the supplied hydraulic pressure. The engagement device CL includes a friction member 31 and a piston 32 that switches an engaged state of the friction member 31.

The friction member 31 includes an outer side friction material 311 and an inner side friction material 312 that are a pair. The outer side friction material 311 and the inner side friction material 312 are both formed in an annular plate shape, and are disposed so that the rotation axes coincide with each other. Further, a plurality of the outer side friction materials 311 and a plurality of the inner side friction materials 312 are provided, and these are disposed alternately along the axial direction L. Either one of the outer side friction material 311 and the inner side friction material 312 may be a friction plate and the other may be a separate plate.

The outer side friction material 311 is supported by the rotor support member 2 in the present example. Specifically, on an inner peripheral surface of the first tubular portion 21 of the rotor support member 2, a plurality of spline teeth extended in the axial direction L is formed to be dispersed in the circumferential direction C. Similar spline teeth are also formed on the outer peripheral surface of the outer side friction material 311, and the outer side friction material 311 is supported from the outer radial side R2 by the first tubular portion 21 in a state in which the spline teeth are engaged. As a result, the outer side friction material 311 is slidably supported in the axial direction L in a state in which the relative rotation in the circumferential direction C is restricted with respect to the rotor support member 2.

The inner side friction material 312 is supported by a friction material support portion 3a coupled to the second rotation member RT2. The friction material support portion 3a is coupled to the second rotation member RT2 so as to protrude from the second rotation member RT2 to the outer radial side R2. In the present embodiment, the friction material support portion 3a is disposed at an end portion on the axial first side L1 of the second rotation member RT2. On the outer peripheral surface of an end portion on the outer radial side R2 of the friction material support portion 3a, a plurality of spline teeth extended in the axial direction L is formed to be dispersed in the circumferential direction C. Similar spline teeth are formed on the inner peripheral surface of the inner side friction material 312, and the inner side friction material 312 is supported from the inner radial side R1 by the friction material support portion 3a in a state in which these spline teeth are engaged. As a result, the inner side friction material 312 is slidably supported in the axial direction L in a state in which the relative rotation in the circumferential direction C is restricted with respect to the friction material support portion 3a.

The piston 32 is disposed on the axial first side L1 with respect to the friction member 31. The piston 32 is urged to the axial first side L1 by the urging member 321. In the present embodiment, when the oil having a predetermined hydraulic pressure is supplied to an oil chamber that is formed between the piston 32 and the support portion 22, the piston 32 slides to the axial second side L2 against an urging force of an urging member 321 in accordance with the hydraulic pressure and presses the friction member 31 from the axial first side L1. Further, in the present embodiment, the piston 32 is extended along the radial direction R, and is formed so that an end portion on the outer radial side R2 of the piston 32 presses the friction member 31.

As described above, the stator St of the rotary electric machine MG is fixed to the second case portion 1B, and the rotor support member 2, the first rotation member RT1, and the second rotation member RT2 are supported so as to be rotatable with respect to the first side wall portion 12 or the second side wall portion 13 that are fixed to the second case portion 1B. Thus, in the present embodiment, the rotary electric machine MG, the engagement device CL, the first rotation member RT1, and the second rotation member RT2 are supported by the second case portion 1B.

The torque converter TC is disposed on the axial first side L1 with respect to the rotary electric machine MG. The torque converter TC corresponds to a "fluid coupling". The torque converter TC includes a pump impeller 41, a turbine runner 42, a lockup clutch 43, and a rotation housing 44. In the present embodiment, the torque converter TC is housed in the case 1. Specifically, the torque converter TC is supported by the first case portion 1A together with the transmission TM.

The pump impeller 41 and the turbine runner 42 are disposed so as to face each other in the axial direction L. In the present embodiment, the pump impeller 41 is disposed so as to face the turbine runner 42 on the axial first side L1. The pump impeller 41 and the turbine runner 42 are supported so as to be rotatable relative to each other. The pump impeller 41 and the turbine runner 42 are disposed on the axial first side L1 with respect to the lockup clutch 43. The pump impeller 41 is coupled to the rotation housing 44 so as to rotate integrally. The turbine runner 42 is coupled so as to rotate integrally with the intermediate shaft M. In the present embodiment, the turbine runner 42 and the intermediate shaft M are coupled by spline engagement so as to move relatively in the axial direction L and rotate integrally in the circumferential direction C. The lockup clutch 43 is configured to selectively set the pump impeller 41 and the turbine runner 42 in a direct connection engaged state. That is, the lockup clutch 43 is configured so that the rotation housing 44 and the intermediate shaft M can be switched to the direct connection engaged state.

The rotation housing 44 houses the pump impeller 41, the turbine runner 42, and the lockup clutch 43. The rotation housing 44 is formed so as to cover the pump impeller 41, the turbine runner 42, and the lockup clutch 43 from both sides in the axial direction L and from the outer radial side R2. The rotation housing 44 includes a coupling portion 45 that is coupled to the first rotation member RT1. The detailed configuration of the coupling portion 45 will be described later.

As shown in FIG. 2, in the present embodiment, the first rotation member RT1 includes a shaft member 51 that is extended along the axial direction L, and a flex plate 52 that is coupled to the shaft member 51 and that is extended along the radial direction R.

Figure 3:
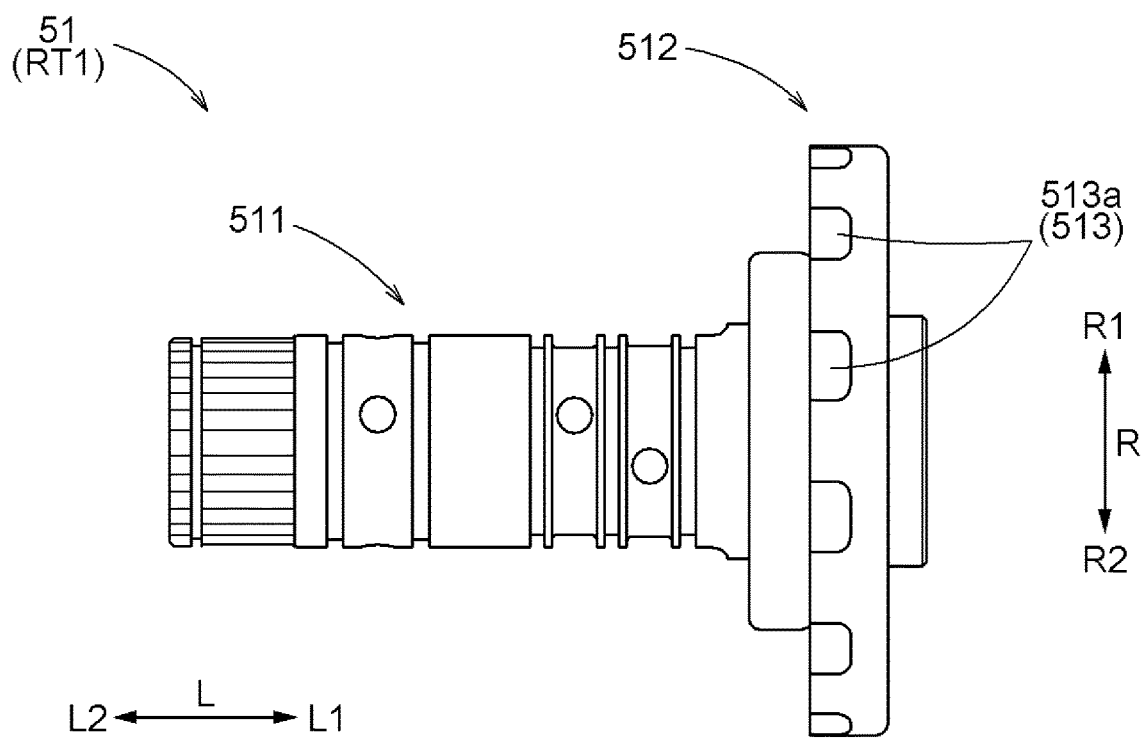
FIG. 3 is a side view of a shaft member of a first rotation member.

As shown in FIGS. 2 and 3, in the present embodiment, the shaft member 51 has a main body portion 511 and an expanded radius portion 512 having a larger dimension in radial direction R than the main body portion 511.

The main body portion 511 is formed in a columnar shape that is extended along the axial direction L. An oil passage is formed inside the main body portion 511. The main body portion 511 is supported by the first side wall portion 12 so that the main body portion 511 is rotatable, in a state of being inserted in a through hole that is extended through the first side wall portion 12 of the case 1 in the axial direction L. Further, the main body portion 511 is coupled to the second tubular portion 23 of the rotor support member 2 so as to rotate integrally with the second tubular portion 23, in a state of being inserted through the second tubular portion 23. In the present embodiment, the spline teeth formed at an end portion on the axial second side L2 of an outer peripheral surface of the main body portion 511 and the spline teeth formed at an end portion on the axial second side L2 of an inner peripheral surface of the second tubular portion 23 are engaged. Thus, the shaft member 51 and the rotor support member 2 are coupled.

Figure 4:
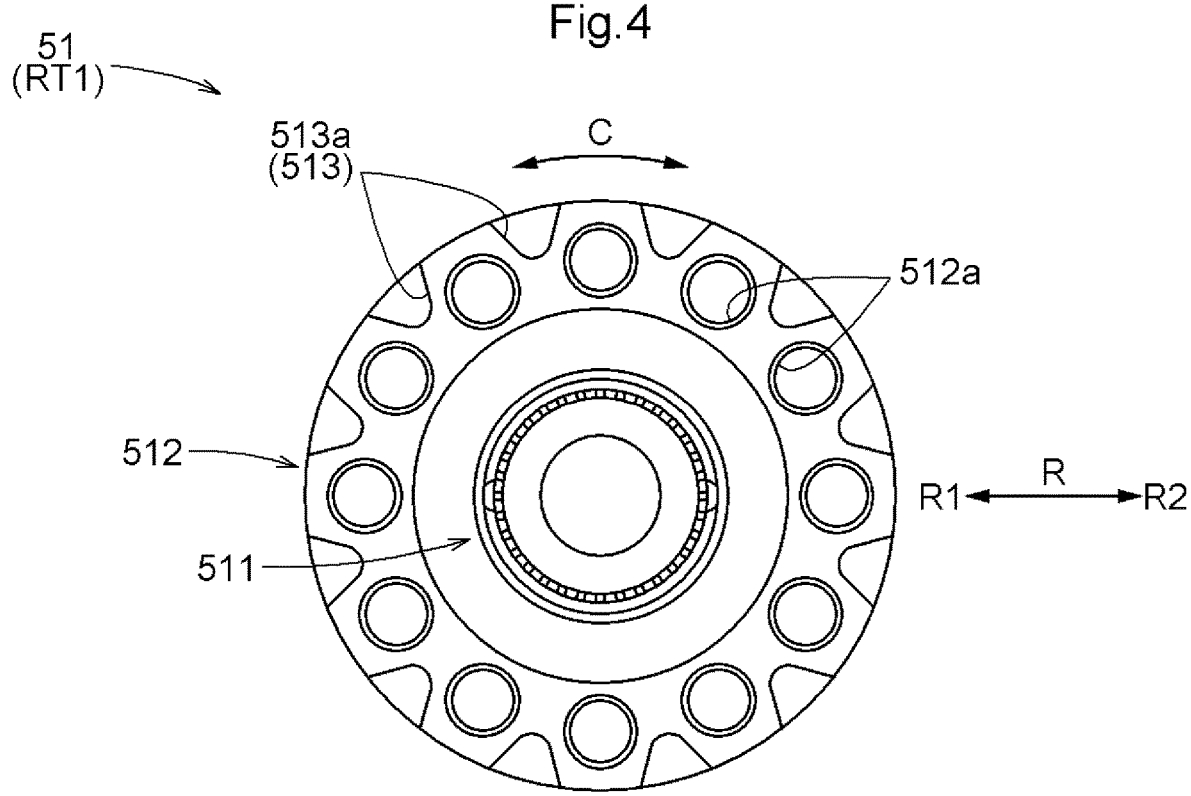
FIG. 4 is a front view of the shaft member of the first rotation member.

As shown in FIGS. 2 to 4, the expanded radius portion 512 is formed in a tubular shape having a radius larger than that of the main body portion 511. In the present embodiment, the expanded radius portion 512 is coupled to an end portion on the axial first side L1 of the main body portion 511, and is formed so as to protrude to the outer radial side R2 with respect to the main body portion 511. The expanded radius portion 512 is coupled to the main body portion 511 so as to be integrally rotatable. In the present embodiment, the expanded radius portion 512 is integrally formed with the main body portion 511. In the illustrated example, the expanded radius portion 512 is formed in a flange shape protruding from the main body portion 511 to the outer radial side R2.

In the present embodiment, a tubular portion 441 provided in the rotation housing 44 of the torque converter TC is inserted in the expanded radius portion 512. Specifically, the expanded radius portion 512 is formed in a tubular shape that opens to the axial first side L1. In contrast, the tubular portion 441 of the rotation housing 44 is also formed in a tubular shape that opens to the axial first side L1. The tubular portion 441 is disposed on the inner radial side R1 with respect to the expanded radius portion 512 so that a sliding portion 441a that is formed so as to protrude from the end portion on the axial second side L2 of the tubular portion 441 to the outer radial side R2 slides in the axial direction L on an inner peripheral surface of the expanded radius portion 512.

As shown in FIG. 4, a fastening hole 512a into which an inner side fastening member F1 (see FIG. 2) that fastens the expanded radius portion 512 and the flex plate 52 is inserted is formed in the expanded radius portion 512. The fastening hole 512a is formed so as to be extended through the expanded radius portion 512 in the axial direction L. A plurality of the fastening holes 512a is disposed at regular intervals along the circumferential direction C. In the illustrated example, twelve fastening holes 512a are disposed. As will be described later, the fastening hole 512a and a recessed portion 513a are alternately disposed along the circumferential direction C so that one recessed portion 513a is positioned between a pair of adjacent fastening holes 512a. In the illustrated example, the inner side fastening member F1 is a bolt.

Figure 5:
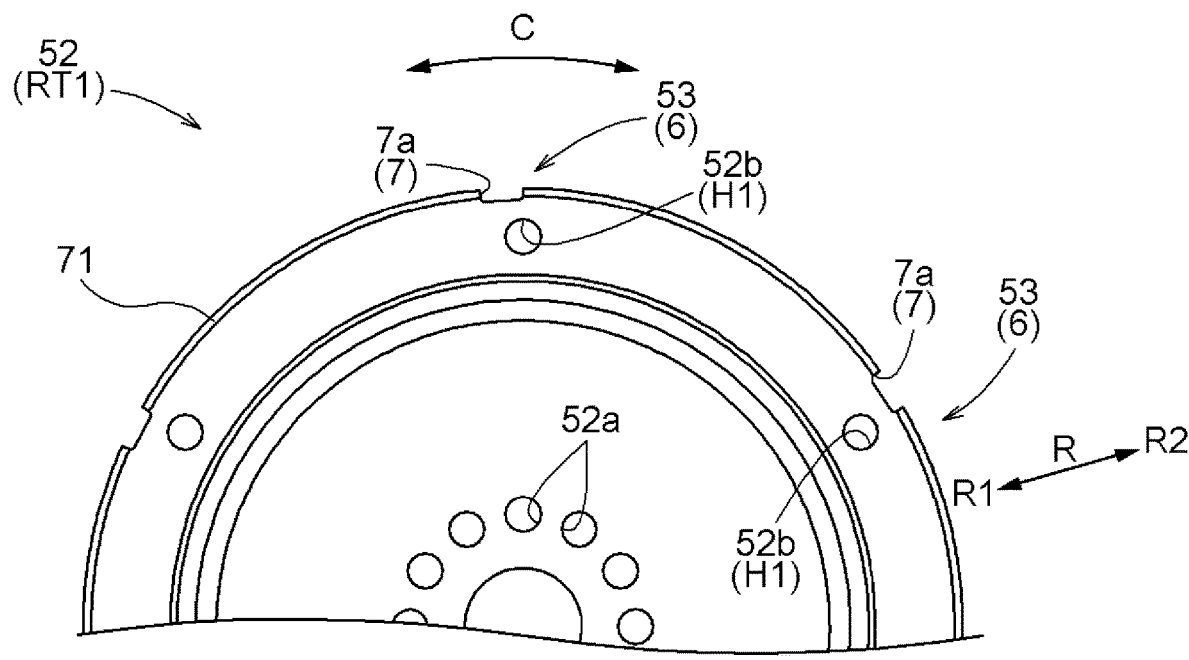
FIG. 5 is a front view of a flex plate of the first rotation member.

As shown in FIGS. 2 and 5, the flex plate 52 is formed in a circular thin plate shape. As shown in FIG. 2, the flex plate 52 is extended along the radial direction R so as to protrude to the outer radial side R2 with respect to the expanded radius portion 512 of the shaft member 51. As shown in FIG. 5, an inner side fastening hole 52a into which the inner side fastening member F1 is inserted is formed in the flex plate 52. The inner side fastening hole 52a is formed so as to be extended through the flex plate 52 in the axial direction L. The inner side fastening hole 52a is disposed on the inner radial side R1 with respect to a central position of a radius of the flex plate 52. A plurality of the inner side fastening holes 52a is disposed at regular intervals along the circumferential direction C. Specifically, the same number (herein, 12) of inner side fastening holes 52a as the number of fastening holes 512a of the expanded radius portion 512 are formed, and the inner side fastening holes 52a are disposed so as to have a positional relationship corresponding to the fastening holes 512a. Then, in a state in which the flex plate 52 and the shaft member 51 are disposed overlapped in the axial direction L so that the plurality of inner side fastening holes 52a and the plurality of fastening holes 512a correspond to each other, the inner side fastening member F1 is inserted in those fastening holes, and the flex plate 52 and the shaft member 51 are fastened.

Further, an outer side fastening hole 52b into which an outer side fastening member F2 (see FIG. 2) that fastens the flex plate 52 and the coupling portion 45 of the rotation housing 44 is inserted is formed in the flex plate 52. The outer side fastening hole 52b is formed so as to be extended through the flex plate 52 in the axial direction L. The outer side fastening hole 52b is disposed on the outer radial side R2 with respect to the central position of the radius of the flex plate 52. A plurality of (herein, six) outer side fastening holes 52b is disposed at regular intervals along the circumferential direction C. In the illustrated example, the outer side fastening member F2 is a bolt.

Figure 6:
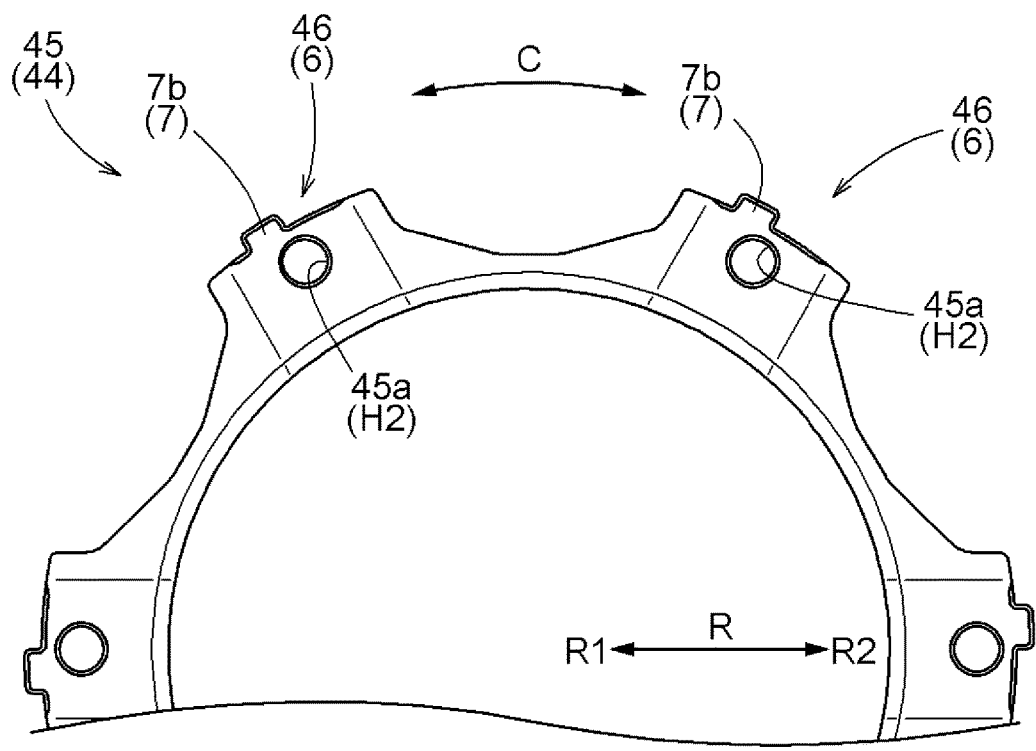
FIG. 6 is a front view of a coupling portion of a rotation housing in a torque converter.

As shown in FIGS. 2 and 6, the coupling portion 45 is formed in an annular plate shape. As shown in FIG. 6, a fastening hole 45a into which the outer side fastening member F2 is inserted is formed in the coupling portion 45. The fastening hole 45a is formed so as to be extended through the coupling portion 45 in the axial direction L. A plurality of the fastening holes 45a is disposed at regular intervals along the circumferential direction C. Specifically, the same number (herein, six) of the fastening holes 45a are formed as the number of the outer side fastening holes 52b of the flex plate 52, and the fastening holes 45a are disposed so as to have a positional relationship corresponding to the outer side fastening holes 52b. Then, in a state in which the coupling portion 45 and the flex plate 52 are disposed overlapped in the axial direction L so that the plurality of fastening holes 45a and the plurality of outer side fastening holes 52b correspond to each other, the outer side fastening member F2 is inserted in those fastening holes, and the coupling portion 45 and the flex plate 52 are fastened.

As shown in FIG. 5, the portion of the flex plate 52 of the first rotation member RT1 in which the outer side fastening hole 52b is formed functions as a first fastening portion 53. Further, as shown in FIG. 6, the portion of the coupling portion 45 of the rotation housing 44 in which the fastening hole 45a is formed functions as a second fastening portion 46. Therefore, the first fastening portion 53 and the second fastening portion 46 function as a "fastening portion 6" in which the first fastening portion 53 and the second fastening portion 46 are fastened to each other by the outer side fastening member F2. Thus, a plurality of fastening portions 6 is provided along the circumferential direction C in the first rotation member RT1 and the rotation housing 44. In the present embodiment, the outer side fastening member F2 corresponds to a "fastening member". Further, the outer side fastening hole 52b of the flex plate 52 corresponds to a "first fastening hole H1" that is formed in the first rotation member RT1 along the axial direction L and into which the fastening member (outer side fastening member F2) is inserted. Then, the fastening hole 45a of the coupling portion 45 in the rotation housing 44 corresponds to a "second fastening hole H2" that is formed in the rotation housing 44 along the axial direction L and into which the fastening member (outer side fastening member F2) is inserted. As described above, each of the plurality of fastening portions 6 has the first fastening hole H1 and the second fastening hole H2.

In the present embodiment, in the flex plate 52, the outer side fastening hole 52b into which the outer side fastening member F2 that fastens the fastening portion 6 is inserted is disposed on the outer radial side R2 with respect to the inner side fastening hole 52a into which the inner side fastening member F1 that fastens the expanded radius portion 512 of the shaft member 51 and the flex plate 52 is inserted (see FIG. 5). That is, in the present embodiment, the fastening portion 6 is disposed on the outer radial side R2 with respect to the coupling portion with the shaft member 51, in the flex plate 52.

As shown in FIGS. 3 and 4, an engagement uneven portion 513 having a plurality of recessed portions and protrusions along the circumferential direction C is formed in the first rotation member RT1. The engagement uneven portion 513 is formed on the inner radial side R1 with respect to the fastening portion 6 in the first rotation member RT1. In the present embodiment, the engagement uneven portion 513 is formed in the expanded radius portion 512.

In the present embodiment, the engagement uneven portion 513 is configured of the plurality of recessed portions 513a. In the present embodiment, the recessed portions 513a are disposed at regular intervals along the circumferential direction C. Further, in the present example, the same number (herein, 12) of recessed portions 513a as that of the fastening holes 512a are disposed. The recessed portions 513a and the fastening holes 512a are alternately disposed along the circumferential direction C so that one recessed portion 513a is positioned between the pair of adjacent fastening holes 512a. Further, the plurality of recessed portions 513a is formed so that an outer peripheral surface of the expanded radius portion 512 is recessed to the inner radial side R1. As a result, the plurality of recessed portions 513a can be appropriately disposed by utilizing the portion in which the fastening holes 512a are not provided. In the illustrated example, the recessed portion 513a is formed from an end surface on the axial second side L2 of the expanded radius portion 512 to a central portion in the axial direction L. Further, in the illustrated example, the recessed portion 513a is formed in a triangular shape in which the interval in the circumferential direction C gradually becomes narrower toward the inner radial side R1 when viewed in the axial direction along the axial direction L.

Figure 11:
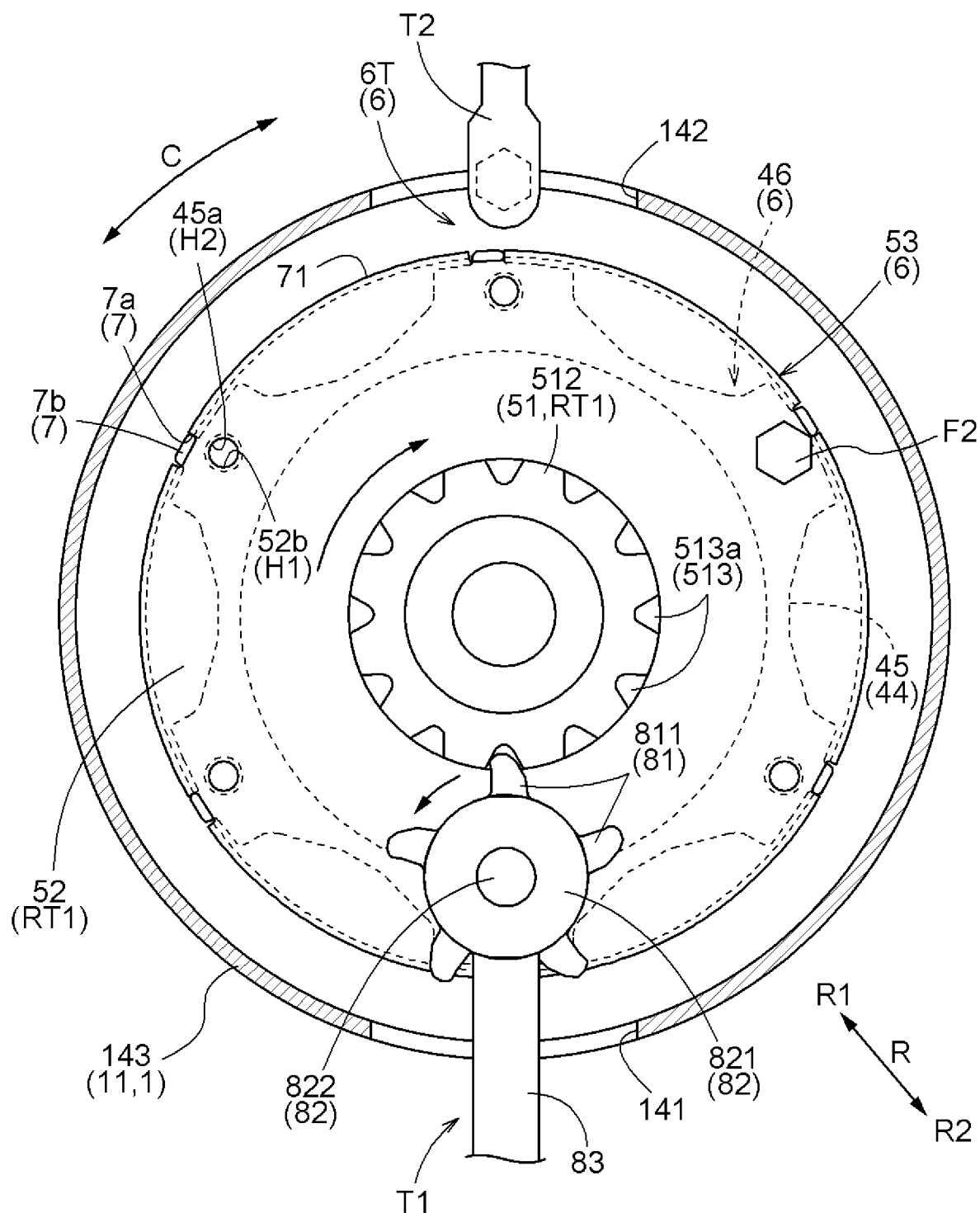
FIG. 11 is a diagram showing a rotating step.
Figure 12:
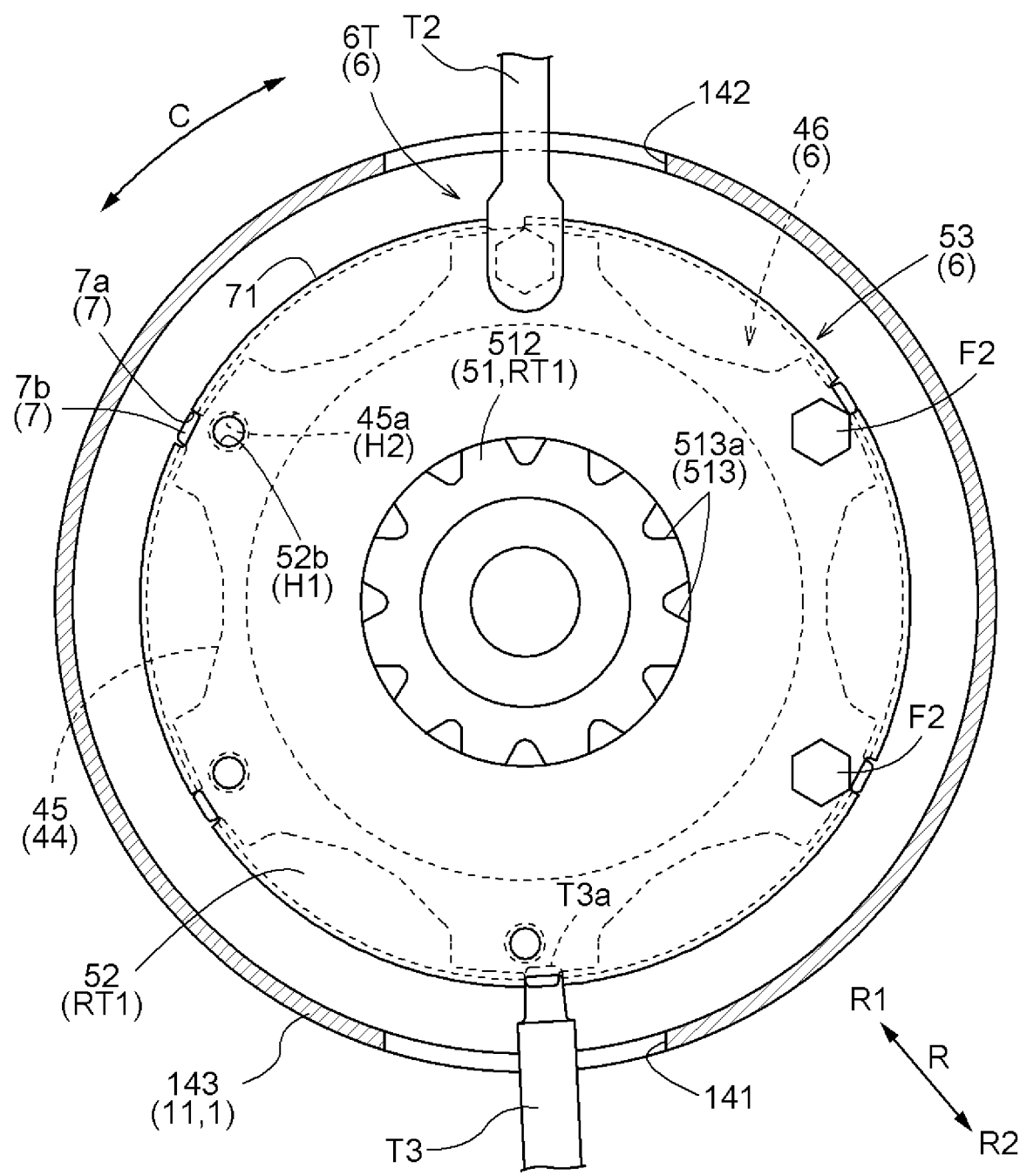
FIG. 12 is a diagram showing a fastening step.

As shown in FIG. 2, a first opening region 141 and a second opening region 142 that communicate the inside and the outside of the case 1 is formed in the case 1. As shown in FIGS. 11 and 12, in the present embodiment, the first opening region 141 and the second opening region 142 are disposed so as to be spaced away from each other in the circumferential direction C. A non-opening region 143 that is covered by a wall portion of the case 1 is provided between the first opening region 141 and the second opening region 142 in the circumferential direction C of the case 1. In the present embodiment, the first opening region 141 and the second opening region 142 are formed on the peripheral wall portion 11 of the case 1. The portion of the peripheral wall portion 11 between the first opening region 141 and the second opening region 142 in the circumferential direction C corresponds to the non-opening region 143. In the illustrated example, the first opening region 141 and the second opening region 142 are disposed at positions facing each other with the axial center of the rotary electric machine MG interposed therebetween. Each of the first opening region 141 and the second opening region 142 is closed by a lid member, which is not shown, when the vehicle drive device 100 is used.

As shown in FIG. 2, the first opening region 141 is disposed in a part of the circumferential direction C of the region in the axial direction L corresponding to the position of the engagement uneven portion 513 in the axial direction L, in the case 1. In the present embodiment, the first opening region 141 is a part of the peripheral wall portion 11 of the case 1 in the circumferential direction C, and is disposed in a portion overlapping the engagement uneven portion 513 when viewed in the radial direction along the radial direction R. Then, the configuration is such that the engagement uneven portion 513 can be visually recognized from the outer radial side R2 of the case 1 through the first opening region 141.

The second opening region 142 is disposed in a part in the circumferential direction C of a region of the axial direction L corresponding to the position of the fastening portion 6 in the axial direction L, in the case 1. In the present embodiment, the second opening region 142 is a part of the peripheral wall portion 11 of the case 1 in the circumferential direction C, and is disposed in a portion overlapping a movement locus of the fastening portion 6 of when the first rotation member RT1 and the rotation housing 44 rotate, when viewed in the radial direction along the radial direction R. The configuration is such that the fastening portion 6 can be visually recognized from the outer radial side R2 of the case 1 through the second opening region 142.

As described above, in the present embodiment, the first opening region 141 and the second opening region 142 are disposed apart from each other in the circumferential direction C, and the first opening region 141 and the second opening region 142 are configured in a similar way other than that they are disposed at different positions in the circumferential direction C in the case 1. Thus, in FIG. 2, for convenience, the reference numerals of both the first opening region 141 and the second opening region 142 are applied to the same place.

Figure 7:
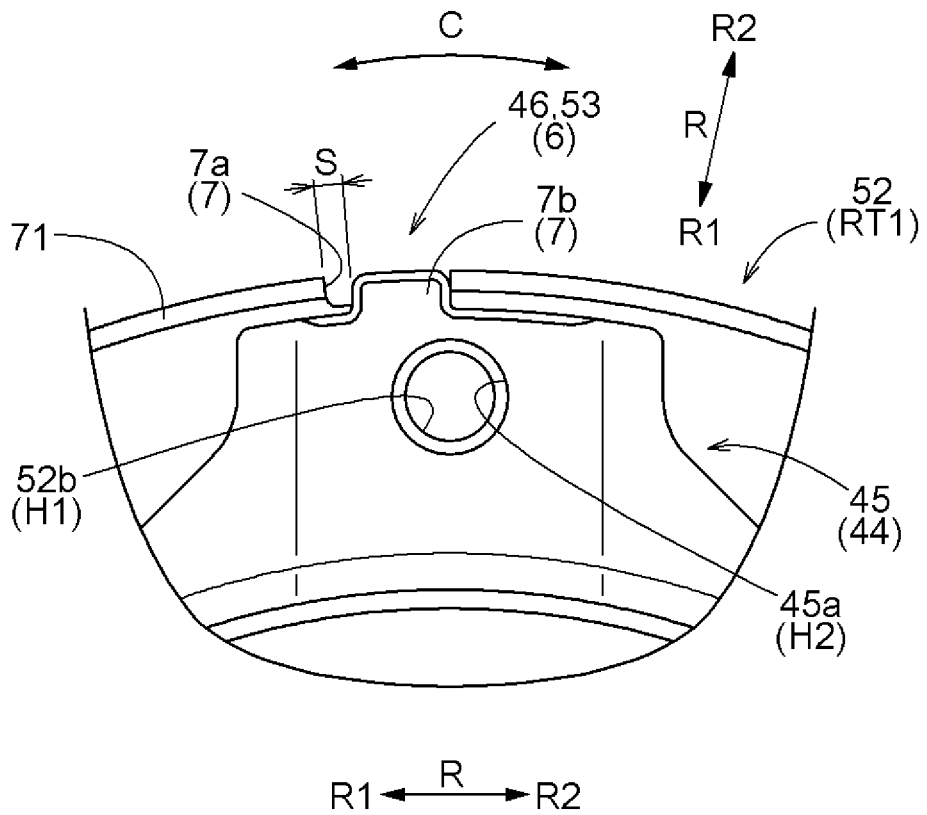
FIG. 7 is a front view of the flex plate and the coupling portion in a state in which a locking portion is locked to a locked portion.
Figure 8:
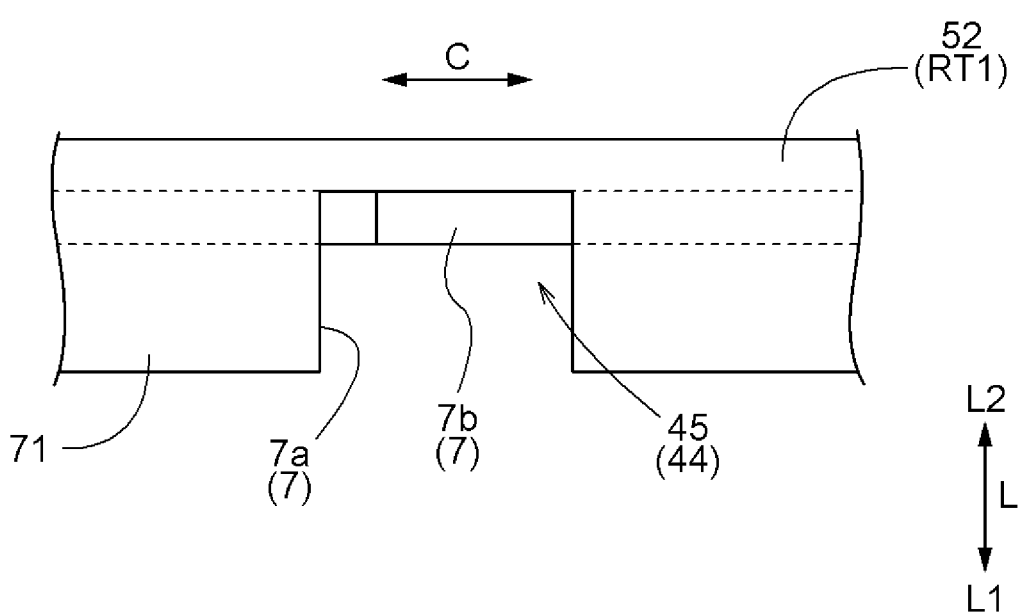
FIG. 8 is a view of the flex plate and the coupling portion in the state in which the locking portion is locked to the locked portion when seen from an outer side in a radial direction.

As shown in FIGS. 5 and 6, a locked portion 7a is provided on an outer peripheral portion of one of the first rotation member RT1 and the rotation housing 44. A locking portion 7b is provided on an outer peripheral portion of the other of the first rotation member RT1 and the rotation housing 44. As shown in FIGS. 7 and 8, the locking portion 7b is inserted in the axial direction L with respect to the locked portion 7a, and is locked so that the relative rotation in the circumferential direction C is restricted with respect to the locked portion 7a.

In the present embodiment, a protruding portion 71 protruding in the axial direction L is provided on the outer peripheral portion of one of the first rotation member RT1 and the rotation housing 44. The locked portion 7a is formed in the protruding portion 71. In the present example, a protruding portion 71 protruding to the axial first side L1 is formed in the flex plate 52 of the first rotation member RT1. That is, in the present example, the locked portion 7a is provided on the outer peripheral portion of the first rotation member RT1. In the illustrated example, the protruding portion 71 is formed so that an end portion on the outer radial side R2 of the flex plate 52 is bent toward the axial first side L1 and thereby protrudes to the axial first side L1. Here, the axial first side L1 corresponds to a "protruding side" that is the other side with respect to one of the first rotation member RT1 and the rotation housing 44. Then, the axial second side L2 corresponds to an "opposite protruding side" that is the opposite side of the protruding side.

As shown in FIGS. 7 and 8, in the present embodiment, the locked portion 7a is formed so as to be notched from an edge on the protruding side (herein, the axial first side L1) of the protruding portion 71 to the opposite protruding side (herein, the axial second side L2) and notched from an inner peripheral surface of the protruding portion 71 to the outer radial side R2. In the present example, the locked portion 7a is formed over the entire region of the protruding portion 71 in the axial direction L. The locked portion 7a is formed so as to be extended through the protruding portion 71 in the radial direction R. In the illustrated example, the locked portion 7a is formed with a constant width in the circumferential direction C. Further, in the present embodiment, a plurality of the locked portions 7a is disposed at regular intervals along the circumferential direction C. In the illustrated example, the same number of the locked portions 7a, that is, six locked portions 7a, as that of the number of outer side fastening holes 52b are disposed. Each of the six locked portions 7a is disposed so as to be adjacent to each other on the outer radial side R2 with respect to the corresponding outer side fastening hole 52b.

In the present embodiment, the locking portion 7b is formed so as to protrude from the outer peripheral portion of the other of the first rotation member RT1 and the rotation housing 44 to the outer radial side R2. In the present example, the locking portion 7b is formed so as to protrude from the coupling portion 45 of the rotation housing 44 to the outer radial side R2.

In the present embodiment, a plurality of the locking portions 7b is disposed at regular intervals along the circumferential direction C. Specifically, the same number (herein, six) of locked portions 7b as the number of the locked portions 7a are formed, and the locking portions 7b are disposed so as to have a positional relationship corresponding to the locked portions 7a.

The coupling portion 45 of the rotation housing 44 is disposed with respect to the flex plate 52 of the first rotation member RT1 so that each of the plurality of locking portions 7b is inserted in the corresponding locked portion 7a. Thus, even when none of the fastening portions 6 are fastened by the outer side fastening member F2, the relative movement of the flex plate 52 and the coupling portion 45 in the circumferential direction C is restricted. In the present example, each of the plurality of locking portions 7b is inserted from the axial first side L1 with respect to the corresponding locked portion 7a, and is locked so that the relative rotation in the circumferential direction C is restricted with respect to the locked portion 7a.

In this way, the locking portion 7b and the locked portion 7a function as a "locking structure 7". That is, the first rotation member RT1 and the rotation housing 44 have the locking structure 7 in which the first rotation member RT1 and the rotation housing 44 are locked to each other in the circumferential direction C, in addition to the plurality of fastening portions 6.

As shown in FIG. 5, in the present embodiment, a disposition region of the locked portion 7a in the circumferential direction C and a disposition region of the first fastening hole H1 in the circumferential direction C overlap. Then, as shown in FIG. 6, a disposition region of the locking portion 7b in the circumferential direction C and a disposition region of the second fastening hole H2 in the circumferential direction C overlap. Thus, as shown in FIG. 7, the disposition region of the locking portion 7b and the locked portion 7a in the circumferential direction C overlaps with the disposition region of the first fastening hole H1 and the second fastening hole H2 in the circumferential direction C.

As shown in FIG. 7, the first fastening hole H1 and the second fastening hole H2 are disposed so as to overlap when viewed in the axial direction along the axial direction L, in a state in which the locking portion 7b is locked to the locked portion 7a. Here, the state in which the first fastening hole H1 and the second fastening hole H2 overlap when viewed in the axial direction along the axial direction L indicates the state in which the first fastening hole H1 and the second fastening hole H2 have a positional relationship in which the fastening member (outer side fastening member F2) can be inserted into both fastening holes H1, H2 in the axial direction L.

In the present embodiment, a clearance S is formed between the locking portion 7b and the locked portion 7a that are locked to each other in the circumferential direction C. That is, the dimension of the locked portion 7a in the circumferential direction C is larger than the dimension of the locking portion 7b in the circumferential direction C. Thus, the locking portion 7b can be relatively moved in the circumferential direction C with respect to the locked portion 7a by the amount of the clearance S. Also, in the present embodiment, the first fastening hole H1 and the second fastening hole H2 are disposed so as to overlap when viewed in the axial direction along the axial direction L, in a state in which the locking portion 7b is in contact with the locked portion 7a from one side in the circumferential direction C.

As shown in FIG. 2, in the present embodiment, the outer side fastening member F2 is inserted in the first fastening hole H1 and the second fastening hole H2 from the opposite protruding side. Here, the outer side fastening member F2 is inserted in the first fastening hole H1 and the second fastening hole H2 from the first rotation member RT1 side with respect to the rotation housing 44 in the axial direction L, that is, from the axial second side L2.

As shown in FIG. 2, in the present embodiment, the plurality of fastening portions 6 is disposed at positions that are on the outer radial side R2 with respect to the lockup clutch 43 and that overlap with the lockup clutch 43 when viewed in the radial direction along the radial direction R. Further, the plurality of fastening portions 6 is disposed at positions overlapping with the pump impeller 41 and the turbine runner 42 when viewed in the axial direction along the axial direction L.

Figure 9:
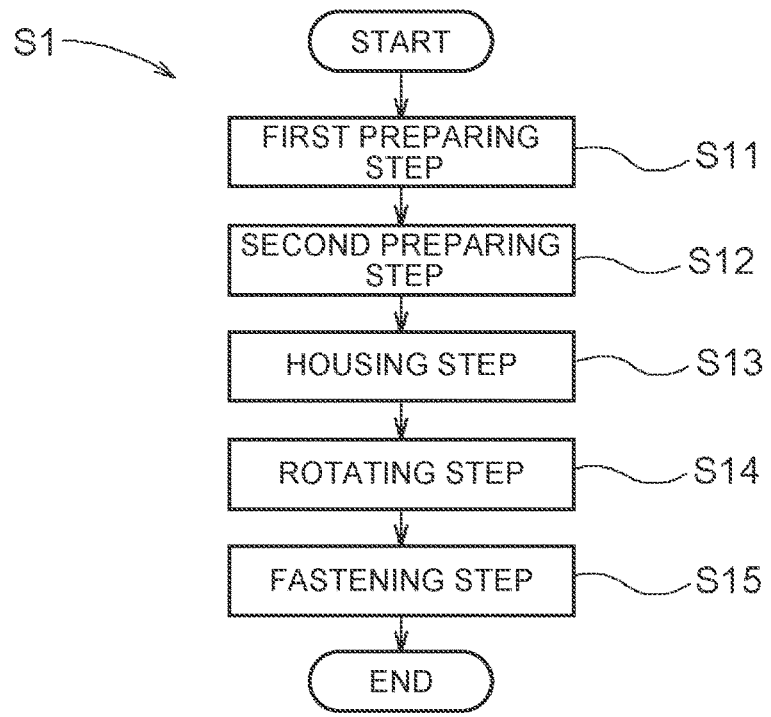
FIG. 9 is a flowchart showing a manufacturing method of the vehicle drive device according to the embodiment.

Hereinafter, a manufacturing step S1 of the vehicle drive device 100 according to the embodiment will be described with reference to the drawings. As shown in FIG. 9, the manufacturing step S1 includes a first preparing step S11, a second preparing step S12, a housing step S13, a rotating step S14, and a fastening step S15.

The first preparing step S11 is a step of preparing the case 1, the first rotation member RT1, the second rotation member RT2, the engagement device CL, the torque converter TC, and the rotary electric machine MG. In the first preparing step S11 of the present embodiment, the intermediate shaft M, the output shaft O, the rotor support member 2, and the transmission TM are also prepared.

Figure 10:
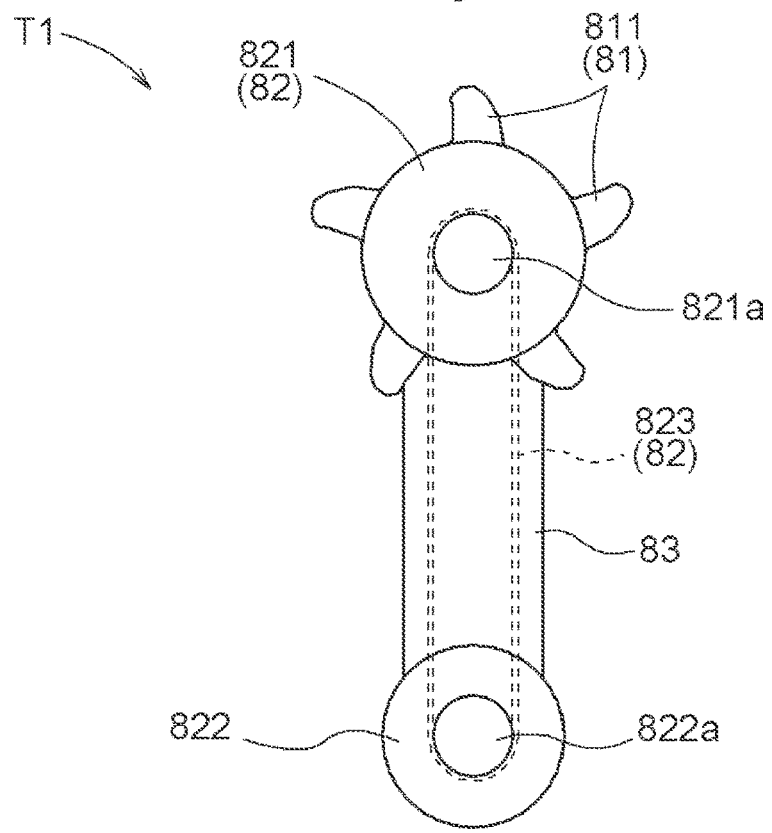
FIG. 10 is a diagram showing a rotation jig.

The second preparing step S12 is a step of preparing a rotation jig T1. The rotation jig T1 is a jig for rotating the first rotation member RT1 from the outside of the case 1. As shown in FIG. 10, the rotation jig T1 includes a gear portion 81 that meshes with the engagement uneven portion 513, and a rotation mechanism 82 that rotates the gear portion 81.

In the present embodiment, a gear portion 81 has a plurality of (herein, five) claw portions 811. The claw portions 811 are formed so as to engage with the recessed portions 513a forming the engagement uneven portion 513.

In the present embodiment, a rotation mechanism 82 includes a rotation body 821, an input member 822, and a wound body 823.

The rotation body 821 is configured to be rotatable around a first shaft portion 821a. The rotation body 821 is formed in a disc shape. The rotation body 821 supports the plurality of claw portions 811. The plurality of claw portions 811 is formed so as to protrude from an outer peripheral surface of the rotation body 821 to the outer radial side R2. Further, the plurality of claw portions 811 is disposed at regular intervals along the circumferential direction of the rotation body 821. A disposition interval (a disposition pitch in the circumferential direction) of the plurality of claw portions 811 corresponds to a disposition interval (a disposition pitch in the circumferential direction) of the plurality of recessed portions 513a configuring the engagement uneven portion 513.

The input member 822 is an input element of the rotation mechanism 82. The input member 822 is configured to be rotatable around the second shaft portion 822a. The input member 822 is manually rotated by an operator or is automatically rotated by an actuator such as a servo motor.

The wound body 823 is a member that transmits a rotation input to the input member 822 to the rotation body 821. The wound body 823 is wound around the first shaft portion 821a and the second shaft portion 822a. As the wound body 823, a chain, a belt, or the like can be adopted. The first shaft portion 821a and the second shaft portion 822a are supported by a support body 83. In the present example, both the first shaft portion 821a and the second shaft portion 822a are supported by the support body 83 so as to be rotatable. However, the first shaft portion 821a may be fixed to the support body 83 and the rotation body 821 may be supported with respect to the first shaft portion 821a so as to be rotatable, and a second shaft portion 822a may be fixed to the support body 83 and the input member 822 may be supported with respect to the second shaft portion 822*a* so as to be rotatable.

The housing step S13 is a step of housing the rotary electric machine MG, the first rotation member RT1, the second rotation member RT2, the engagement device CL, and the torque converter TC in the case 1 so that the position of the engagement uneven portion 513 in the axial direction L corresponds to the position of the first opening region 141 of the case 1 in the axial direction L, and the position of the fastening portion 6 in the axial direction L corresponds to the position of the second opening region 142 of the case 1 in the axial direction L. As shown in FIG. 2, in the present embodiment, the housing step S13 is performed so that the engagement uneven portion 513 overlaps with the first opening region 141 when viewed in the radial direction R, and the movement locus of the fastening portion 6 when the first rotation member RT1 and the rotation housing 44 are rotated overlaps with the second opening region 142 when viewed in the radial direction R.

In the housing step S13 of the present embodiment, each of the plurality of locking portions 7*b* is locked to the corresponding locked portion 7*a*. Specifically, the coupling portion 45 of the rotation housing 44 is relatively moved from the axial first side L1 with respect to the flex plate 52 of the first rotation member RT1 so that each of the plurality of locking portions 7*b* is inserted in the corresponding locked portion 7*a*. As a result, the plurality of locking portions 7*b* and the plurality of locked portions 7*a* corresponding to each other are locked to each other, and the first rotation member RT1 and the rotation housing 44 are locked to each other in the circumferential direction C.

Further, in the housing step S13 of the present embodiment, the intermediate shaft M, the rotor support member 2, the transmission TM, and the like are also housed in the case 1. In the present embodiment, the case 1 includes the first case portion 1A and the second case portion 1B. Work of manufacturing a first sub-assembly configured by assembling the first configuration member group including the torque converter TC to the first case portion 1A, and a second sub-assembly configured by assembling a second configuration member group including the rotary electric machine MG and the first rotation member RT1 to the second case portion 1B is performed first. After that, the first sub-assembly and the second sub-assembly are assembled. Then, in the assembling operation of the first sub-assembly and the second sub-assembly, when the first case portion 1A and the second case portion 1B are joined, as described above, the coupling portion 45 of the rotation housing 44 is relatively moved from the axial first side L1 with respect to the flex plate 52 of the first rotation member RT1 so that each of the plurality of locking portions 7*b* is inserted in the corresponding locked portion 7*a*. After that, in order to fasten the torque converter TC and the first rotation member RT1 at the plurality of fastening portions 6, the rotating step S14 and the fastening step S15, which will be described later, are executed. Here, the first configuration member group includes the transmission TM in addition to the torque converter TC. Further, the second configuration member group includes the second rotation member RT2, the engagement device CL, the first side wall portion 12, and the second side wall portion 13 in addition to the rotary electric machine MG and the first rotation member RT1.

As shown in FIG. 11, the rotating step S14 is a step in which the rotation jig T1 is inserted into the case 1 through the first opening region 141, the gear portion 81 of the rotation jig T1 is rotated in a state in which the gear portion 81 is meshed with the engagement uneven portion 513, the position of a target fastening portion 6T, which is one of the plurality of fastening portions 6, in the circumferential direction C is made to correspond to the position of the second opening region 142 in the circumferential direction C. The target fastening portion 6T is the fastening portion 6 that has not yet been fastened by the outer side fastening member F2.

In the present embodiment, in the housing step S13, each of the plurality of locking portions 7*b* is locked to the corresponding locked portion 7*a*. Thus, even in a state in which none of the fastening portions 6 are fastened, in the rotating step S14, by rotating the gear portion 81 of the rotation jig T1 in a state in which the gear portion 81 is meshed with the engagement uneven portion 513, the first rotation member RT1 and the rotation housing 44 are integrally rotated, and the position of the target fastening portion 6T in the circumferential direction C can be made to correspond to the position of the second opening region 142 in the circumferential direction C.

As shown in FIG. 12, the fastening step S15 is a step of fastening the target fastening portion 6T with the outer side fastening member F2 through the second opening region 142. In the fastening step S15 of the present embodiment, a fastening tool T2 is inserted inside the case 1 through the second opening region 142, and the outer side fastening member F2 is fastened to the target fastening portion 6T by the fastening tool T2.

Further, in the fastening step S15 of the present embodiment, a reaction force receiving tool T3 that receives a reaction force at the time of fastening the fastening portion 6 is inserted inside the case 1 through the first opening region 141. Then, the target fastening portion 6T is fastened through the second opening region 142, in a state in which the rotation of the first rotation member RT1 and the rotation housing 44 in the circumferential direction C is restricted by the reaction force receiving tool T3.

In the illustrated example, the reaction force receiving tool T3 includes a locking body T3*a* that is locked to the locked portion 7*a*. Then, by locking the locking body T3*a* of the reaction force receiving tool T3 with respect to the locked portion 7*a* from the outer radial side R2, the rotation of the first rotation member RT1 and the rotation housing 44 in the circumferential direction C is restricted. In the present example, the locking body T3*a* of the reaction force receiving tool T3 is locked from the outer radial side R2 to a portion of the locked portion 7*a* in which the locking portion 7*b* is not disposed (here, the portion on the axial first side L1 of the locked portion 7*a* with respect to the locking portion 7*b*). In order to realize this, in the illustrated example, each of the plurality of locked portions 7*a* is disposed at a position in the circumferential direction C corresponding to the first opening region 141, in the fastening step S15.

In the manufacturing step S1, the rotating step S14 and the fastening step S15 are repeated until all the fastening portions 6 are fastened. In this way, the torque converter TC and the first rotation member RT1 are coupled so as to rotate integrally. After all the fastening portions 6 are fastened, each of the first opening region 141 and the second opening region 142 is closed by the lid member described above that is not shown.

Figure 13:
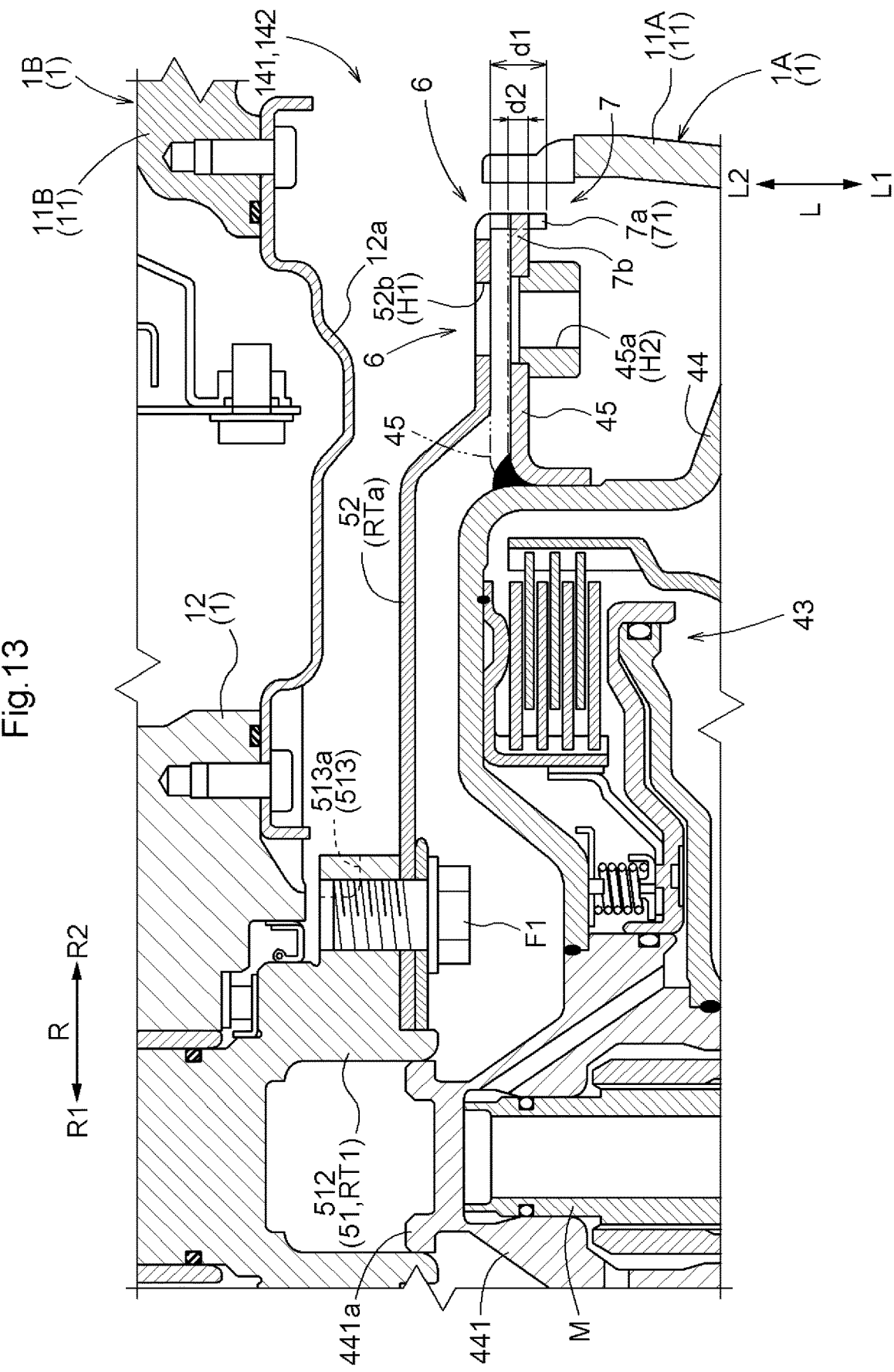
FIG. 13 is a diagram showing a housing step according to another embodiment.

In the present embodiment, as shown in FIG. 13, an axial dimension d1 that is a dimension of the locked portion 7*a* in the axial direction L is larger than an axial movable range d2 that is a range in which the first rotation member RT1 and the rotation housing 44 are relatively movable in the axial direction L (d1>d2), in a state in which none of the fastening portions 6 are fastened. As a result, in the housing step S13, by inserting the locking portion 7b in the locked portion 7a in the axial direction L so that they are brought in a locking state, even when the relative movement is performed so that the locking portion 7b is spaced away from the locked portion 7a in the axial direction L, the locking state of the locking portion 7b and the locked portion 7a can be maintained.

In the example shown in FIG. 13, in a state in which none of the fastening portions 6 are fastened, due to the own weight of the torque converter TC, etc., the rotation housing 44 is moved to the axial first side L1 until an inner surface in the tubular portion 441 facing the axial first side L1 is in contact with an end surface on the axial second side L2 of the intermediate shaft M. In contrast, the position of the first rotation member RT1 in the axial direction L is fixed by the rotor support member 2 coupled to the first rotation member RT1 (see FIG. 2). At this time, the state is such that the first rotation member RT1 and the rotation housing 44 are spaced away from each other in the axial direction L the most. In contrast, when the coupling portion 45 of the rotation housing 44 comes into contact with the flex plate 52 of the first rotation member RT1 from axial first side L1 (see the coupling portion 45 shown by the long dashed double-short dashed line in FIG. 13), the state is such that the first rotation member RT1 and the rotation housing 44 are closest to each other in the axial direction L. In such a configuration, when a range, from the position at which the coupling portion 45 of the rotation housing 44 is farthest from the flex plate 52 of the first rotation member RT1 in the axial direction L to the position at which the coupling portion 45 of the rotation housing 44 is in contact with the flex plate 52 of the first rotation member RT1 from the axial first side L1, in which the rotation housing 44 is movable in the axial direction L is set as a "first range", the first range corresponds to the axial movable range d2.

When the first rotation member RT1 is allowed to move to the axial second side L2 so as to be spaced away from the rotation housing 44 in the axial direction L, when a range, from the position at which the coupling portion 45 of the rotation housing 44 is farthest from the flex plate 52 of the first rotation member RT1 in the axial direction L to the position at which the flex plate 52 of the first rotation member RT1 is in contact with the coupling portion 45 of the rotation housing 44 from the axial second side L2, in which the first rotation member RT1 is movable in the axial direction L is set as a "second range", the sum of the second range and the first range corresponds to the axial movable range d2.

In a configuration in which the axial dimension d1 is larger than the axial movable range d2, as shown in FIG. 13, in order to improve the workability of the housing step S13, it is preferable that the housing step S13 be performed in a state in which the axial direction L is along the vertical direction so that the axial second side L2 is an upper side in the vertical direction. In addition, following the housing step S13, the rotating step S14 and the fastening step S15 may also be performed in a state in which the axial direction L is along the vertical direction.

Other Embodiments (1) In the embodiment described above, a configuration is described as an example in which the first opening region 141 is a part of the peripheral wall portion 11 of the case 1 in the circumferential direction C, and is disposed in a portion overlapping the engagement uneven portion 513 when viewed in the radial direction R. However, without being limited to such a configuration, if the rotation of the first rotation member RT1 using the engagement uneven portion 513 can be performed through the first opening region 141, the engagement uneven portion 513 and the first opening region 141 may be disposed in a positional relationship in which the engagement uneven portion 513 and the first opening region 141 are shifted in the axial direction L so as not to overlap when viewed in the radial direction R.

(2) In the embodiment described above, a configuration is described as an example in which the second opening region 142 is a part of the peripheral wall portion 11 of the case 1 in the circumferential direction C, and is disposed in a portion overlapping a movement locus of the fastening portion 6 of when the first rotation member RT1 and the rotation housing 44 rotate, when viewed in the radial direction R. However, without being limited to such a configuration, if the target fastening portion 6T can be fastened through the second opening region 142, the movement locus of the fastening portion 6 and the second opening region 142 may be disposed in a positional relationship in which the movement locus of the fastening portion 6 and the second opening region 142 are shifted in the axial direction L so as not to overlap when viewed in the radial direction R.

(3) In the embodiment described above, a configuration is described as an example in which the first opening region 141 and the second opening region 142 are disposed apart from each other in the circumferential direction C. However, without being limited to such a configuration, for example, the first opening region 141 and the second opening region 142 may be disposed apart from each other in the axial direction L. Further, the first opening region 141 and the second opening region 142 may be formed so as to be continuous.

(4) In the embodiment described above, a configuration is described as an example in which the plurality of recessed portions 513a, which is formed so that the outer peripheral surface of the expanded radius portion 512 is recessed, forms the engagement uneven portion 513. However, the present disclosure is not limited to such a configuration, and for example, the engagement uneven portion 513 may be configured of a plurality of protruding portions formed so that the outer peripheral surface of the expanded radius portion 512 protrudes to the outer radial side R2. Alternatively, the engagement uneven portion 513 may be configured by a combination of the plurality of protruding portions and the plurality of recessed portions 513a.

(5) In the embodiment described above, a configuration is described as an example in which the first rotation member RT1 includes the shaft member 51 and the flex plate 52. However, the configuration is not limited to such a configuration, and for example, the configuration may be such that the first rotation member RT1 does not include the flex plate 52 and the expanded radius portion 512 of the shaft member 51 is directly coupled to the rotation housing 44. Alternatively, the shaft member 51 and the rotation housing 44 may be coupled by a coupling member different from the flex plate 52.

(6) In the embodiment described above, a configuration is described as an example in which the engagement uneven portion 513 is formed in the expanded radius portion 512 of the shaft member 51 of the first rotation member RT1. However, the configuration is not limited to such a configuration, and the configuration may be such that the engagement uneven portion 513 is formed in a portion of the shaft member 51 other than the expanded radius portion 512, such as the main body portion 511. Alternatively, the configuration may be such that the engagement uneven portion 513 is formed in a member in the first rotation member RT1 other than the shaft member 51 such as the flex plate 52 of the first rotation member RT1.

(7) In the embodiment described above, a configuration is described as an example in which the rotation jig T1 and the reaction force receiving tool T3 are independent jigs. However, the rotation jig T1 and the reaction force receiving tool T3 may be configured integrally. In this case, it is preferable that the rotation jig T1 and the reaction force receiving tool T3 be configured to act alternately on the first rotation member RT1 and the rotation housing 44. For example, it is preferable that the configuration is such that the relative positional relationship of the rotation jig T1 and the reaction force receiving tool T3 be changeable so that, in a state in which the rotation jig T1 is engaged with the engagement uneven portion 513 of the first rotation member RT1, the reaction force receiving tool T3 is spaced away from the first rotation member RT1 and the rotation housing 44, and in a state in which the reaction force receiving tool T3 is in contact with at least one of the first rotation member RT1 and the rotation housing 44, the rotation jig T1 is spaced away from the first rotation member RT1.

(8) In the embodiment described above, a configuration is described as an example in which the reaction force receiving tool T3 has the locking body T3a, and in the fastening step S15, the locking body T3a is locked to the portion of the locked portion 7a in which the locking portion 7b is not disposed, from the outer radial side R2. However, the configuration is not limited to such a configuration. For example, the configuration may be such that by bringing the reaction force receiving tool T3 into contact with the outer peripheral surface of the protruding portion 71 and the outer peripheral portion of the locking portion 7b of the coupling portion 45, a frictional force in the circumferential direction C is generated between the flex plate 52 and the coupling portion 45 to restrict rotation of the flex plate 52 and the coupling portion 45.

(9) In the embodiment described above, a configuration is described as an example in which the locked portion 7a is formed so as to be notched from an edge on the axial first side L1 of the protruding portion 71 to the axial second side L2 and be notched from the inner peripheral surface of the protruding portion 71 to the outer radial side R2, and the locking portion 7b is formed so as to protrude from the coupling portion 45 of the rotation housing 44 to the outer radial side R2. However, without being limited to such a configuration, for example, the configuration may be such that the locking portion 7b formed so as to protrude in the axial direction L is inserted from one side in the axial direction L with respect to the locked portion 7a formed in a tubular shape that is extended in the axial direction L.

(10) In the embodiment described above, a configuration is described as an example in which the locked portion 7a is formed on the protruding portion 71 provided on the flex plate 52 of the first rotation member RT1, and the locking portion 7b is formed in the coupling portion 45 of the rotation housing 44. However, without being limited to such a configuration, for example, the locked portion 7a may be formed in a portion of the flex plate 52 other than the protruding portion 71, and the locking portion 7b may be formed in a portion of the rotation housing 44 other than the coupling portion 45. Further, the locked portion 7a may be provided in the rotation housing 44, and the locking portion 7b may be provided in the first rotation member RT1.

(11) In the embodiment described above, a configuration is described as an example in which the protruding portion 71 protruding to the axial first side L1 is provided on the outer peripheral portion of the flex plate 52 of the first rotation member RT1. However, without being limited to such a configuration, for example, the protruding portion 71 protruding to the axial second side L2 may be provided on the outer peripheral portion of the coupling portion 45 of the rotation housing 44. In this case, the axial second side L2 corresponds to the "protruding side", and the axial first side L1 corresponds to the "opposite protruding side".

(12) In the embodiment described above, a configuration is described as an example in which the clearance S is formed between the locking portion 7b and the locked portion 7a in the circumferential direction C in which the locking portion 7b and the locked portion 7a are locked to each other, and in a state in which the locking portion 7b is in contact with the locked portion 7a from one side in the circumferential direction C, the first fastening hole H1 and the second fastening hole H2 are disposed so as to overlap when viewed in the axial direction along the axial direction L. However, without being limited to such a configuration, the first fastening hole H1 and the second fastening hole H2 may be disposed so as to overlap when viewed in the axial direction along the axial direction L, in a state in which the locking portion 7b is not in contact with the locked portion 7a from one side in the circumferential direction C. Further, the clearance S may not be formed between the locking portion 7b and the locked portion 7a in the circumferential direction C, in which the locking portion 7b and the locked portion 7a are locked to each other.

(13) In the embodiment described above, a configuration is described as an example in which in a state in which none of the fastening portions 6 are fastened, the axial dimension d1 that is the dimension of the locked portion 7a in the axial direction L is larger than the axial movable range d2 that is the relative movement distance of the locking portion 7b with respect to the locked portion 7a (d1>d2), when the first rotation member RT1 and the rotation housing 44 are moved between the positions at which the two are closest to each other in the axial direction L and the positions at which the two are farthest from each other in the axial direction L. However, without being limited to such a configuration, the axial dimension d1 may be equal to or less than the axial movable range d2 (d1≤d2).

(14) In the embodiment described above, a configuration is described as an example in which the outer side fastening member F2 is inserted in the first fastening hole H1 and the second fastening hole H2 from the axial second side L2. However, with being limited to such a configuration, the outer side fastening member F2 may be inserted in the first fastening hole H1 and the second fastening hole H2 from the axial first side L1.

(15) The configurations disclosed in each of the above embodiments can be applied in combination with the configurations disclosed in other embodiments as long as there is no contradiction. With respect to other configurations, the embodiments disclosed herein are merely exemplary in all respects. Therefore, various modifications can be made as appropriate without departing from the spirit of the present disclosure.

Outline of Embodiment Described Above

Hereinafter, the outline of the vehicle drive device (100) described above will be described.

A vehicle drive device (100) includes: a rotary electric machine (MG) serving as a driving force source for wheels (W); a first rotation member (RT1) coupled to a rotor (Ro)

of the rotary electric machine (MG); and a fluid coupling (TC) that is disposed on an axial first side (L1), which is one side in an axial direction (L) with respect to the rotary electric machine (MG), and that has a rotation housing (44), in which a plurality of fastening portions (6) is provided in the first rotation member (RT1) and the rotation housing (44) along a circumferential direction (C), the first rotation member (RT1) and the rotation housing (44) are fastened by a fastening member (F2) at each of the plurality of fastening portions (6), each of the plurality of fastening portions (6) has a first fastening hole (H1) that is formed in the first rotation member (RT1) along the axial direction (L) and in which the fastening member (F2) is inserted, and a second fastening hole (H2) that is formed in the rotation housing (44) along the axial direction (L) and in which the fastening member (F2) is inserted, a locked portion (7a) is provided on an outer peripheral portion of one of the first rotation member (RT1) and the rotation housing (44), a locking portion (7b) is provided on an outer peripheral portion of the other of the first rotation member (RT1) and the rotation housing (44), the locking portion (7b) is inserted in an axial direction (L) with respect to the locked portion (7a) and is locked so that a relative rotation in the circumferential direction (C) is restricted with respect to the locked portion (7a), and the first fastening hole (H1) and the second fastening hole (H2) are disposed so as to overlap with each other when viewed in the axial direction along the axial direction (L) in a state in which the locking portion (7b) is locked to the locked portion (7a).

According to the present configuration, by putting the locking portion (7b) in a state of being locked to the locked portion (7a), even when none of the fastening portions (6) are fastened by the fastening member (F2), the relative movement of the first rotation member (RT1) and the rotation housing (44) in the circumferential direction (C) can be restricted. Thus, even in a state in which none of the fastening portions (6) are fastened by the fastening member (F2), it is possible to maintain a state in which the first fastening hole (H1) and the second fastening hole (H2) are overlapped when viewed in the axial direction along the axial direction (L). As a result, the work of fastening the fastening portion (6) can be easily performed. As a result, the man-hours for manufacturing the vehicle drive device can be reduced. Further, according to the present configuration, the work of fastening the fastening portion (6) can be performed without using a jig such as a pin for aligning the positions of the first fastening hole (H1) and the second fastening hole (H2). Thus, it is not necessary to separately perform the step of installing the jig and the step of removing the jig, and it is not necessary to ensure a space for performing those steps. As a result, it is possible to reduce the man-hours required for manufacturing the vehicle drive device, and it is possible to suppress an increase in size of the vehicle drive device.

Here, it is preferable that a clearance (S) be formed between the locking portion (7b) and the locked portion (7a), which are locked to each other, in the circumferential direction (C), and the first fastening hole (H1) and the second fastening hole (H2) be disposed so as to overlap with each other when viewed in the axial direction in a state in which the locking portion (7b) is in contact with the locked portion (7a) from one side in the circumferential direction (C).

According to the present configuration, since the dimension of the locked portion (7a) in the circumferential direction (C) is larger than the dimension of the locking portion (7b) in the circumferential direction (C), the locking portion (7b) can be easily inserted in the locked portion (7a).

Further, in a state in which the locking portion (7b) is inserted in the locked portion (7a), just by performing relative rotation of the first rotation member (RT1) and the rotation housing (44) in the circumferential direction (C), the first fastening hole (H1) and the second fastening hole (H2) can be easily overlapped when viewed in the axial direction.

Further, it is preferable that the other side with respect to one of the first rotation member (RT1) and the rotation housing (44) in the axial direction (L) be set as a protruding side, and an opposite side in the axial direction (L) from the protruding side be set as an opposite protruding side, a protruding portion (71) that protrudes to the protruding side be provided on an outer peripheral portion of one of the first rotation member (RT1) and the rotation housing (44), the locked portion (7a) be formed so as to be notched from an edge on the protruding side of the protruding portion (71) to the opposite protruding side and be notched from an inner peripheral surface of the protruding portion (71) to an outer side (R2) in a radial direction (R), the locking portion (7b) be formed so as to protrude from an outer peripheral portion of the other of the first rotation member (RT1) and the rotation housing (44) to the outer side (R2) in the radial direction (R), and in a state in which none of the fastening portions (6) are fastened, a dimension (d1) of the locked portion (7a) in the axial direction (L) be larger than a range (d2) in which the first rotation member (RT1) and the rotation housing (44) can move relatively in the axial direction (L).

According to the present configuration, in a state in which none of the fastening portions (6) are fastened, even when the first rotation member (RT1) and the rotation housing (44) are spaced away from each other in the axial direction (L) the most, it is possible to maintain the locking state of the locking portion (7b) and the locked portion (7a). As a result, even if none of the fastening portions (6) are fastened, the work of fastening the fastening portions (6) can be easily performed.

It is preferable that in the configuration provided with the protruding portion (71), the fastening member (F2) be inserted in the first fastening hole (H1) and the second fastening hole (H2) from the opposite protruding side.

According to the present configuration, the fastening member (F2) is inserted in the first fastening hole (H1) and the second fastening hole (H2) from the opposite protruding side that is the opposite side of the protruding side on which the protruding portion (71) is protruded. Thus, when the fastening member (F2) is inserted in the first fastening hole (H1) and the second fastening hole (H2), it is possible to prevent the fastening member (F2) from interfering with the protruding portion (71). Therefore, the work of fastening the fastening portion (6) can be performed more easily.

Further, it is preferable that the fluid coupling (TC) include a pump impeller (41) and a turbine runner (42) that are disposed so as to face each other in the axial direction (L) and that are supported so as to be rotatable relative to each other, and a lockup clutch (43) that selectively sets the pump impeller (41) and the turbine runner (42) in a direct connection engaged state, the pump impeller (41) and the turbine runner (42) be disposed on the axial first side (L1) with respect to the lockup clutch (43), the rotation housing (44) houses the pump impeller (41), the turbine runner (42), and the lockup clutch (43), and be coupled to the pump impeller (41) so as to rotate integrally with the pump impeller (41), and the plurality of fastening portions (6) be disposed at a position that is on an outer side (R2) in a radial direction (R) with respect to the lockup clutch (43), at which the plurality of fastening portions (6) overlaps with the lockup clutch (43) when viewed in the radial direction along the radial direction (R), and at which the plurality of fastening portions (6) overlaps with the pump impeller (41) and the turbine runner (42) when viewed in the axial direction.

According to such a configuration, the plurality of fastening portions (6) is disposed at positions that are on the outer side (R2) in the radial direction (R) with respect to the lockup clutch (43) and that overlap with the lockup clutch (43) when viewed in the radial direction along the radial direction (R). As a result, compared to the configuration in which the plurality of fastening portions (6) is disposed at positions shifted in the axial direction (L) with respect to the lockup clutch (43), the dimension of the vehicle drive device (100) in the axial direction (L) can be suppressed to be small. Further, according to the present configuration, the plurality of fastening portions (6) is disposed at positions overlapping with the pump impeller (41) and the turbine runner (42) when viewed in the axial direction along the axial direction (L). As a result, compared to the configuration in which the plurality of fastening portions (6) is disposed on the outer side (R2) in the radial direction (R) with respect to the pump impeller (41) and the turbine runner (42), the dimension of the vehicle drive device (100) in the radial direction (R) can be suppressed to be small.

In a configuration in which the fastening member (F2) is inserted in the first fastening hole (H1) and the second fastening hole (H2) from the opposite protruding side, or a configuration in which the fluid coupling (TC) has the pump impeller (41), the turbine runner (42), and the lockup clutch (43), it is preferable that the fastening member (F2) be inserted in the first fastening hole (H1) and the second fastening hole (H2) from a side of the first rotation member (RT1) with respect to the rotation housing (44) in the axial direction (L).

Generally, by fastening the first rotation member (RT1) and the rotation housing (44) at the fastening portion (6), the first assembly including the rotary electric machine (MG) and the first rotation member (RT1) and the second assembly including the fluid coupling (TC) are coupled to each other in the axial direction (L). Thus, an excess space is likely to be formed on the first rotation member (RT1) side with respect to the fastening portion (6) in the axial direction (L). According to the present configuration, since the work of fastening the fastening portion (6) can be performed by using this space, it is possible to suppress the dimension of the vehicle drive device (100) in the axial direction (L) to be small, compared to when a space for fastening the fastening portion (6) is separately provided. Further, in the above configuration in which the fluid coupling (TC) includes the pump impeller (41), the turbine runner (42), and the lockup clutch (43), there is no need to ensure a space for fastening the fastening portion (6) between the fastening portion (6) and the pump impeller (41) and between the fastening portion (6) and the turbine runner (42) in the axial direction (L). As a result, the distance between the fastening portion (6) and the pump impeller (41), and between the fastening portion (6) and the turbine runner (42) in the axial direction (L) can be suppressed to be small. Thus, the dimension of the vehicle drive device (100) in the axial direction (L) can be suppressed to be small.

Further it is preferable that a disposition region of the locking portion (7b) and the locked portion (7a) in the circumferential direction (C) and a disposition region of the first fastening hole (H1) and the second fastening hole (H2) in the circumferential direction (C) be overlapped.

According to such a configuration, when the locked portion (7a) is provided on the outer peripheral portion of the first rotation member (RT1) and the locking portion (7b) is provided on the outer peripheral portion of the rotation housing (44), the dimension in the circumferential direction (C) of each of the portion of the first rotation member (RT1) in which the locked portion (7a) and the first rotation member (RT1) are disposed, and the portion of the rotation housing (44) in which the locking portion (7b) and the second rotation member (RT2) are disposed can be suppressed to be small. Further, when the locking portion (7b) is provided on the outer peripheral portion of the first rotation member (RT1) and the locked portion (7a) is provided on the outer peripheral portion of the rotation housing (44), the dimension in the circumferential direction (C) of each of the portion of the first rotation member (RT1) in which the locking portion (7b) and the first rotation member (RT1) are disposed, and the portion of the rotation housing (44) in which the locked portion (7a) and the second rotation member (RT2) are disposed can be suppressed to be small. Thus, according to the present configuration, since the weight of the first rotation member (RT1) and the rotation housing (44) can be suppressed to be small, the weight of the vehicle drive device (100) can be reduced.

It is preferable that the vehicle drive device (100) further include: a second rotation member (RT2) that is disposed coaxially with the first rotation member (RT1) and that is drivingly coupled to an internal combustion engine (EN); and an engagement device (CL) that is disposed between the first rotation member (RT1) and the second rotation member (RT2) in a power transmitting path, and that selectively couples the rotary electric machine (MG) and the internal combustion engine (EN), in which the second rotation member (RT2) be disposed on an axial second side (L2) that is an opposite side of the first rotation member (RT1) from the axial first side (L1), and the second rotation member (RT2) be rotatable independently from the first rotation member (RT1).

According to such a configuration, even when it is difficult to directly rotate the first rotation member (RT1) from the outside in the work of fastening the fastening portion (6), the first rotation member (RT1) can be rotated via the second rotation member (RT2) by putting the engagement device (CL) in the engaged state and driving the internal combustion engine (EN).

INDUSTRIAL APPLICABILITY

The technique according to the present disclosure can be used for a vehicle drive device including a rotary electric machine serving as a driving force source for wheels, and a fluid coupling.

DESCRIPTION OF THE REFERENCE NUMERALS

100: vehicle drive device
44: rotation housing
6: fastening portion
W: wheels
MG: rotary electric machine
Ro: rotor
TC: torque converter (fluid coupling)
RT1: first rotation member
RT2: second rotation member
F2: outer side fastening member (fastening member)
L: axial direction L1: axial first side
L2: axial second side
R: radial direction
R1: inner radial side
R2: outer radial side
C: circumferential direction

The invention claimed is:

1. A vehicle drive device comprising:
a rotary electric machine that serves as a driving force source for wheels;
a first rotation member coupled to a rotor of the rotary electric machine; and
a fluid coupling that is disposed on an axial first side, which is one side in an axial direction with respect to the rotary electric machine, and that has a rotation housing, wherein
a plurality of fastening portions is provided in the first rotation member and the rotation housing along a circumferential direction,
the first rotation member and the rotation housing are fastened by a fastening member at each of the plurality of fastening portions,
each of the plurality of fastening portions has a first fastening hole that is formed in the first rotation member along the axial direction and in which the fastening member is inserted, and a second fastening hole that is formed in the rotation housing along the axial direction and in which the fastening member is inserted,
a locked portion is provided on an outer radial side of one of the first rotation member and the rotation housing,
a locking portion is provided on an outer radial side of the other of the first rotation member and the rotation housing,
the locking portion is inserted in the axial direction with respect to the locked portion and is locked so that a relative rotation in the circumferential direction is restricted with respect to the locked portion, and
the first fastening hole and the second fastening hole are disposed so as to overlap with each other when viewed in the axial direction along the axial direction in a state in which the locking portion is locked to the locked portion.

2. The vehicle drive device according to claim 1, wherein
a clearance is formed between the locking portion and the locked portion, which are locked to each other, in the circumferential direction, and
the first fastening hole and the second fastening hole are disposed so as to overlap with each other when viewed in the axial direction in a state in which the locking portion is in contact with the locked portion from one side in the circumferential direction.

3. The vehicle drive device according to claim 2, wherein
the other side with respect to one of the first rotation member and the rotation housing in the axial direction is set as a protruding side, and an opposite side in the axial direction from the protruding side is set as an opposite protruding side,
a protruding portion that protrudes to the protruding side is provided on an outer peripheral portion of one of the first rotation member and the rotation housing,
the locked portion is formed so as to be notched from an edge on the protruding side of the protruding portion to the opposite protruding side and be notched from an inner peripheral surface of the protruding portion to an outer side in a radial direction,
the locking portion is formed so as to protrude from an outer peripheral portion of the other of the first rotation member and the rotation housing to the outer side in the radial direction, and
in a state in which none of the fastening portions are fastened, a dimension of the locked portion in the axial direction is larger than a range in which the first rotation member and the rotation housing can move relatively in the axial direction.

4. The vehicle drive device according to claim 3, wherein the fastening member is inserted in the first fastening hole and the second fastening hole from the opposite protruding side.

5. The vehicle drive device according to claim 4, wherein
the fluid coupling includes a pump impeller and a turbine runner that are disposed so as to face each other in the axial direction and that are supported so as to be rotatable relative to each other, and a lockup clutch that selectively sets the pump impeller and the turbine runner in a direct connection engaged state,
the pump impeller and the turbine runner are disposed on the axial first side with respect to the lockup clutch,
the rotation housing houses the pump impeller, the turbine runner, and the lockup clutch, and is coupled to the pump impeller so as to rotate integrally with the pump impeller, and
the plurality of fastening portions is disposed at a position that is on an outer side in a radial direction with respect to the lockup clutch, at which the plurality of fastening portions overlaps with the lockup clutch when viewed in the radial direction along the radial direction, and at which the plurality of fastening portions overlaps with the pump impeller and the turbine runner when viewed in the axial direction.

6. The vehicle drive device according to claim 5, wherein the fastening member is inserted in the first fastening hole and the second fastening hole from a side of the first rotation member with respect to the rotation housing in the axial direction.

7. The vehicle drive device according to claim 6, wherein a disposition region of the locking portion and the locked portion in the circumferential direction and a disposition region of the first fastening hole and the second fastening hole in the circumferential direction are overlapped.

8. The vehicle drive device according to claim 7, further comprising:
a second rotation member that is disposed coaxially with the first rotation member and that is drivingly coupled to an internal combustion engine; and
an engagement device that is disposed between the first rotation member and the second rotation member in a power transmitting path, and that selectively couples the rotary electric machine and the internal combustion engine, wherein
the second rotation member is disposed on an axial second side that is an opposite side of the first rotation member from the axial first side, and the second rotation member is rotatable independently from the first rotation member.

9. The vehicle drive device according to claim 1, wherein
the other side with respect to one of the first rotation member and the rotation housing in the axial direction is set as a protruding side, and an opposite side in the axial direction from the protruding side is set as an opposite protruding side, a protruding portion that protrudes to the protruding side is provided on an outer peripheral portion of one of the first rotation member and the rotation housing, the locked portion is formed so as to be notched from an edge on the protruding side of the protruding portion to the opposite protruding side and be notched from an inner peripheral surface of the protruding portion to an outer side in a radial direction, the locking portion is formed so as to protrude from an outer peripheral portion of the other of the first rotation member and the rotation housing to the outer side in the radial direction, and in a state in which none of the fastening portions are fastened, a dimension of the locked portion in the axial direction is larger than a range in which the first rotation member and the rotation housing can move relatively in the axial direction.

10. The vehicle drive device according to claim 9, wherein the fastening member is inserted in the first fastening hole and the second fastening hole from the opposite protruding side.

11. The vehicle drive device according to claim 10, wherein the fluid coupling includes a pump impeller and a turbine runner that are disposed so as to face each other in the axial direction and that are supported so as to be rotatable relative to each other, and a lockup clutch that selectively sets the pump impeller and the turbine runner in a direct connection engaged state, the pump impeller and the turbine runner are disposed on the axial first side with respect to the lockup clutch, the rotation housing houses the pump impeller, the turbine runner, and the lockup clutch, and is coupled to the pump impeller so as to rotate integrally with the pump impeller, and the plurality of fastening portions is disposed at a position that is on an outer side in a radial direction with respect to the lockup clutch, at which the plurality of fastening portions overlaps with the lockup clutch when viewed in the radial direction along the radial direction, and at which the plurality of fastening portions overlaps with the pump impeller and the turbine runner when viewed in the axial direction.

12. The vehicle drive device according to claim 11, wherein the fastening member is inserted in the first fastening hole and the second fastening hole from a side of the first rotation member with respect to the rotation housing in the axial direction.

13. The vehicle drive device according to claim 12, wherein a disposition region of the locking portion and the locked portion in the circumferential direction and a disposition region of the first fastening hole and the second fastening hole in the circumferential direction are overlapped.

14. The vehicle drive device according to claim 13, further comprising:

a second rotation member that is disposed coaxially with the first rotation member and that is drivingly coupled to an internal combustion engine; and an engagement device that is disposed between the first rotation member and the second rotation member in a power transmitting path, and that selectively couples the rotary electric machine and the internal combustion engine, wherein the second rotation member is disposed on an axial second side that is an opposite side of the first rotation member from the axial first side, and the second rotation member is rotatable independently from the first rotation member.

15. The vehicle drive device according to claim 1, wherein the fluid coupling includes a pump impeller and a turbine runner that are disposed so as to face each other in the axial direction and that are supported so as to be rotatable relative to each other, and a lockup clutch that selectively sets the pump impeller and the turbine runner in a direct connection engaged state, the pump impeller and the turbine runner are disposed on the axial first side with respect to the lockup clutch, the rotation housing houses the pump impeller, the turbine runner, and the lockup clutch, and is coupled to the pump impeller so as to rotate integrally with the pump impeller, and the plurality of fastening portions is disposed at a position that is on an outer side in a radial direction with respect to the lockup clutch, at which the plurality of fastening portions overlaps with the lockup clutch when viewed in the radial direction along the radial direction, and at which the plurality of fastening portions overlaps with the pump impeller and the turbine runner when viewed in the axial direction.

16. The vehicle drive device according to claim 15, wherein the fastening member is inserted in the first fastening hole and the second fastening hole from a side of the first rotation member with respect to the rotation housing in the axial direction.

17. The vehicle drive device according to claim 16, wherein a disposition region of the locking portion and the locked portion in the circumferential direction and a disposition region of the first fastening hole and the second fastening hole in the circumferential direction are overlapped.

18. The vehicle drive device according to claim 17, further comprising:

a second rotation member that is disposed coaxially with the first rotation member and that is drivingly coupled to an internal combustion engine; and an engagement device that is disposed between the first rotation member and the second rotation member in a power transmitting path, and that selectively couples the rotary electric machine and the internal combustion engine, wherein the second rotation member is disposed on an axial second side that is an opposite side of the first rotation member from the axial first side, and the second rotation member is rotatable independently from the first rotation member.

19. The vehicle drive device according to claim 1, wherein a disposition region of the locking portion and the locked portion in the circumferential direction and a disposition region of the first fastening hole and the second fastening hole in the circumferential direction are overlapped.

20. The vehicle drive device according to claim 1, further comprising:

a second rotation member that is disposed coaxially with the first rotation member and that is drivingly coupled to an internal combustion engine; and an engagement device that is disposed between the first rotation member and the second rotation member in a power transmitting path, and that selectively couples the rotary electric machine and the internal combustion engine, wherein the second rotation member is disposed on an axial second side that is an opposite side of the first rotation member from the axial first side, and the second rotation member is rotatable independently from the first rotation member.

\* \* \* \* \*